US009485253B2

(12) United States Patent
Carlson et al.

(10) Patent No.: US 9,485,253 B2
(45) Date of Patent: *Nov. 1, 2016

(54) FAMILIAR DYNAMIC HUMAN CHALLENGE RESPONSE TEST CONTENT

(71) Applicant: Visa International Service Association, San Francisco, CA (US)

(72) Inventors: Mark Carlson, Half Moon Bay, CA (US); Shalini Mayor, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,040

(22) Filed: Oct. 23, 2015

(65) Prior Publication Data

US 2016/0057143 A1    Feb. 25, 2016

Related U.S. Application Data

(63) Continuation of application No. 13/721,647, filed on Dec. 20, 2012, now Pat. No. 9,195,822.

(60) Provisional application No. 61/577,861, filed on Dec. 20, 2011.

(51) Int. Cl.
*G06F 21/45* (2013.01)
*G06F 21/31* (2013.01)
*H04L 29/06* (2006.01)

(52) U.S. Cl.
CPC ........... *H04L 63/0876* (2013.01); *G06F 21/31* (2013.01); *G06F 21/45* (2013.01); *H04L 63/20* (2013.01); *G06F 2221/2133* (2013.01)

(58) Field of Classification Search
CPC .................. G06F 21/45; G06F 21/31; G06F 2221/2133; H04L 63/20; H04L 63/0876
USPC ....................................................... 726/6, 26
See application file for complete search history.

(56) References Cited

U.S. PATENT DOCUMENTS 7,266,693 B1    9/2007    Potter et al.
7,891,005 B1    2/2011    Baluja et al.
(Continued)

FOREIGN PATENT DOCUMENTS

KR    10-2009-0054872 A    6/2009
KR    10-2010-0116298 A    11/2010
KR    10-2011-0062931 A    6/2011

OTHER PUBLICATIONS

International Search Report and Written Opinion for Application No. PCT/US2012/070900, dated Apr. 22, 2013, 11 pages.

*Primary Examiner* — Kambiz Zand
*Assistant Examiner* — Benjamin Kaplan
(74) *Attorney, Agent, or Firm* — Kilpatrick Townsend Stockton LLP

(57) ABSTRACT

Embodiments of the invention are directed to human challenge response test delivery systems and methods. Specifically, embodiments of the present invention are directed to secure human challenge response test delivery services of configurable difficulty for user devices. One embodiment of the present invention is directed to methods and systems for implementing a familiar and dynamic human challenge response test challenge repository created from transaction data. The dynamic human challenge response test challenge repository may be created by a server computer receiving a plurality of transaction data. Challenge items may be extracted from the transaction data using an extraction algorithm. Furthermore, in some embodiments a challenge message may be sent to a requestor, a verification request may be received, and the verification request may be compared to the challenge message. Another embodiment may be directed at using user information in a human challenge response test to mutually authenticate a user and a service provider.

20 Claims, 11 Drawing Sheets

(56) References Cited

U.S. PATENT DOCUMENTS

| | | |
|---|---|---|
| 7,908,223 B2 | 3/2011 | Klein et al. |
| 7,929,805 B2 | 4/2011 | Wang et al. |
| 8,316,310 B2* | 11/2012 | Champion ............ G06F 21/316 709/203 |
| 2003/0154406 A1* | 8/2003 | Honarvar ............... G06Q 10/10 726/10 |
| 2011/0029902 A1* | 2/2011 | Bailey .................... G06F 21/36 715/764 |
| 2011/0178927 A1 | 7/2011 | Lindelsee et al. |
| 2011/0225634 A1 | 9/2011 | Pai |
| 2012/0246008 A1* | 9/2012 | Hamilton, II .......... G06Q 30/02 705/14.66 |
| 2013/0205370 A1 | 8/2013 | Kalgi et al. |

\* cited by examiner

FIG. 8A

What is your mother's maiden name? — 810A

[crossed-out names: Doe, Brio, Jackson, Jackson, Lewis, Stern, Smith, Jones, Stewart] — 820A Smith — 830A

FIG. 8B

What is the name of your first dog? — 810B

[crossed-out names: Fido, Rufus, Jeff, Max, Granis, Skip] — 820B

Fido — 830B

FIG. 8C

Please enter the last 4 digits of your Account # — 810C

[crossed-out numbers] — 820C

Please enter the last 4 digits of your Phone # — 810D

[crossed-out numbers] — 820D

7328 — 830D

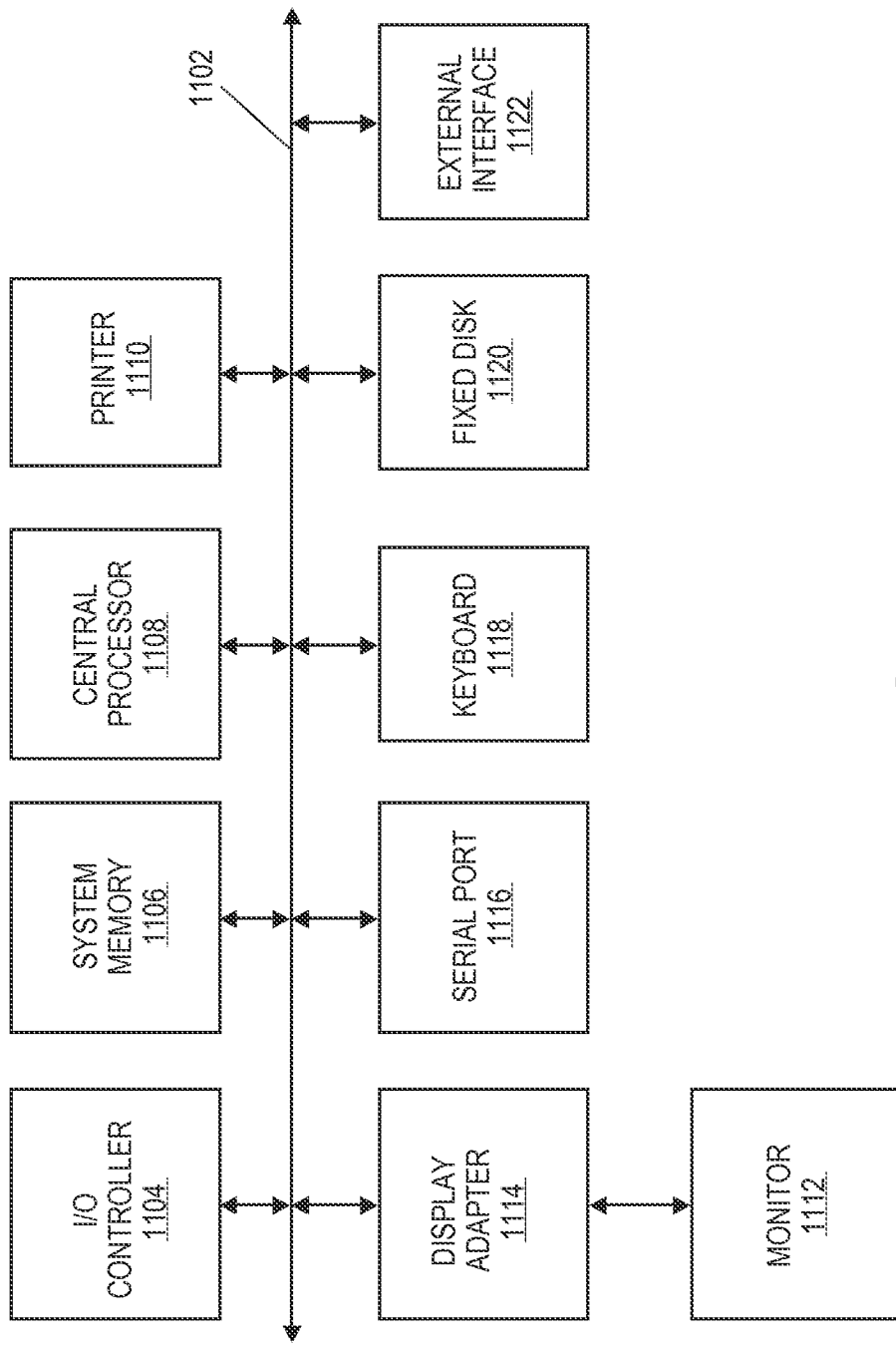

FAMILIAR DYNAMIC HUMAN CHALLENGE RESPONSE TEST CONTENT

CROSS-REFERENCES TO RELATED APPLICATIONS

This application is a continuation application of U.S. patent application Ser. No. 13/721,647, filed Dec. 20, 2012 which claims the benefit of U.S. Provisional Application No. 61/577,861, filed Dec. 20, 2011, both of which are hereby incorporated by reference in their entirety for all purposes.

BACKGROUND

Challenge response authentication is a type of test where one party presents a question ("challenge") and another party must provide a valid answer ("response") to be authenticated. Challenge response tests may be used in computing in an attempt to ensure that a response is generated by a human. For example, a Completely Automated Public Turing test to tell Computers and Humans Apart ("CAPTCHA") test is a type of challenge-response test used in computing as an attempt to ensure that the response is generated by a human and not an automated computer program. The process usually involves one computer (e.g., a server computer) asking a user device to complete a simple test which the computer is able to generate and grade. Because other computers are assumed to be unable to solve the challenge response test, any user entering a correct solution is presumed to be human.

Challenge response tests attempting to ensure that a response is generated by a human (hereinafter, "human challenge response tests") can generate challenges either randomly or using information from a data source. Random human challenge response tests generate challenges using random combinations of letters, numbers, and other data. However, random human challenge response tests can be difficult for humans to interpret because challenges are strange collections of numbers and letters that makes no sense to the human user. For example, a challenge message including the string, "wd243xe!asd" may be more difficult for a user to understand, identify, and replicate than a word or information they are familiar with. Furthermore, human challenge response tests typically include a distorted image of the underlying challenge, and the distortion combined with the unfamiliar nature of the random challenges make the challenges very difficult for humans to interpret accurately. This difficulty results in less accuracy by the system for determining which request is generated by a human and which is generated by an automated computer program. Accordingly, the unfamiliar or random human challenge response tests may lead to a less effective system because humans may be inaccurately identified as automated computer programs due to overly complex challenge messages comprising unfamiliar information.

Human challenge response tests generated from a data source generate a challenge using words or other data from a database. The source generated challenges can be easier to interpret for humans because humans can relate the collections of words or other existing data in the challenges to words or other data that they have likely seen before or are familiar with. However, human challenge response tests generated from a source must have a sufficiently large source database to provide nearly infinite variations of challenges in order to ensure that the system cannot be solved by an automated computer program designed to circumvent the human challenge response test system. Additionally, if a hacker or other malicious third party gains access to a source database, the hacker or third party may map the database to possible answers and may be able to circumvent or solve the human challenge response test data. Accordingly, there is a need for a sufficiently large and dynamic amount of data that may be large enough and refreshed frequently enough to circumvent any attempts by hackers to map or solve the human challenge response test delivery service.

Additionally, previous source derived human challenge response test systems may generate challenges from various data sources that a user may not be familiar with. Accordingly, it may be difficult for a user to solve the challenge even though they are human. As such, the accuracy and effectiveness of the system may be limited because the system may reject responses from humans, believing them to be automated computer programs. Therefore, it may be desirable to provide familiar challenge messages that a user may recognize from their past experiences.

Furthermore, some service providers may use human challenge response tests as part of an authentication procedure to ensure users that are attempting to gain access to account information or other secure information or are requesting a service are human as well as being the particular human associated with an account or user. However, in prior systems, multiple communication messages may be sent between a service provider and a human challenge response test delivery system. Accordingly, the authentication and human challenge response test processes may use more system resources and time, and may delay authorized users from accessing information and services. Accordingly, there is a need to provide a fast, efficient, and secure method of mutual authentication of a user and a system that additionally identifies a requestor or user as being human.

Embodiments of the present invention address these problems and other problems individually and collectively.

BRIEF SUMMARY

Embodiments of the invention are directed to human challenge response test delivery systems. Specifically, embodiments of the present invention are directed to secure human challenge response test delivery services of configurable difficulty for users. The human challenge response test delivery service may be used for authentication that a user is a human, or in some embodiments, authenticate that a user is the particular human they present themselves to be. At the same time, the human challenge response test can authenticate the service provider to the user by providing familiar information associated with a user identifier associated with the user as part of the challenge message generated by the human challenge response test delivery service.

One embodiment of the present invention is directed to a method comprising receiving transaction data associated with a plurality of transactions and extracting, by a server computer, a plurality of challenge items from the transaction data using an extraction algorithm. The method further includes storing the plurality of challenge items in a challenge repository, wherein the plurality of challenge items may be used to generate distorted challenge messages. Additionally, the method may include providing a distorted challenge message comprising one or more of the plurality of challenge items from the challenge repository. In some embodiments, the method may further include receiving a challenge message request from a requestor, determining a difficulty level for the challenge message request, and generating a challenge message comprising one or more of the plurality of challenge items from the challenge repository.

The method may further include distorting the challenge message to create a distorted challenge message, sending the distorted challenge message to the requestor, receiving a challenge verification request from the requestor, determining whether the challenge verification request matches the challenge message, and sending a challenge verification response indicating whether the challenge verification request matches the challenge message.

Another embodiment of the present invention is directed to a server computer comprising a processor and a non-transitory computer readable medium coupled to the processor and comprising code executable by the processor to implement a method. The method may comprise receiving transaction data associated with a plurality of transactions and extracting a plurality of challenge items from the transaction data using an extraction algorithm. The method further includes storing the plurality of challenge items in a challenge repository, wherein the plurality of challenge items may be used to generate distorted challenge messages. Additionally, the method may include providing a distorted challenge message comprising one or more of the plurality of challenge items from the challenge repository. In some embodiments, the method may further include receiving a challenge message request from a requestor, determining a difficulty level for the challenge message request, and generating a challenge message comprising one or more of the plurality of challenge items from the challenge repository. The method may further include distorting the challenge message to create a distorted challenge message, sending the distorted challenge message to the requestor, receiving a challenge verification request from the requestor, determining whether the challenge verification request matches the challenge message, and sending a challenge verification response indicating whether the challenge verification request matches the challenge message.

Additionally, another embodiment of the present invention is directed to a method comprising receiving a user identifier, determining a challenge repository associated with the user identifier, and generating, by a server computer, a challenge message including a personal challenge item from the challenge repository and one or more false challenges. The personal challenge item may be associated with a challenge question and the false challenges may be associated with the challenge question. The method may further include distorting the challenge message to create a distorted challenge message and providing the distorted challenge message and the challenge question to a user, wherein the challenge question is associated with the personal challenge item. Additionally, some embodiments of the method may further include receiving a challenge response from the user, determining whether the challenge response matches the personal challenge item, and authenticating the user if the challenge response matches the personal challenge item, wherein the user authenticates the server computer if the user recognizes the personal challenge item.

Another embodiment of the present invention is directed to a server computer comprising a processor and a non-transitory computer readable medium coupled to the processor and comprising code executable by the processor to implement a method. The method comprising receiving a user identifier, determining a challenge repository associated with the user identifier, and generating a challenge message including a personal challenge item from the challenge repository and one or more false challenges. The personal challenge item may be associated with a challenge question and the false challenges may be associated with the challenge question. The method may further include distorting the challenge message to create a distorted challenge message and providing the distorted challenge message and the challenge question to a user, wherein the challenge question is associated with the personal challenge item. Additionally, some embodiments of the method may further include receiving a challenge response from the user, determining whether the challenge response matches the personal challenge item, and authenticating the user if the challenge response matches the personal challenge item, wherein the user authenticates the server computer if the user recognizes the personal challenge item.

Embodiments of the present invention provide one or more advantages including making human challenge response test challenges easier for humans to interpret while keeping challenges difficult for software to circumvent. The human challenge response test uses familiar content that will be easily recognized by a user such as merchants, zip codes, addresses, or other transaction related data in a particular geographic area associated with the user, while being random enough to detect malicious software. Furthermore, the embodiment directed to mutual authentication using a human challenge response test delivery service provides mutual authentication between the parties, while limiting automated computer attacks, in fewer steps than previous systems. Additionally, the challenges are familiar to the user and increase the accuracy of the human challenge response test system.

These and other embodiments of the invention are described in further detail below.

BRIEF DESCRIPTION OF THE FIGURES

FIG. 8A-8D show exemplary distorted challenge messages and associated challenge questions that may sent to a user device, according to one embodiment of the present invention.

FIG. 11 shows a high level block diagram of a computer system that may be used to implement a server or routing system according to an embodiment of the technology.

DETAILED DESCRIPTION

Figure 1:
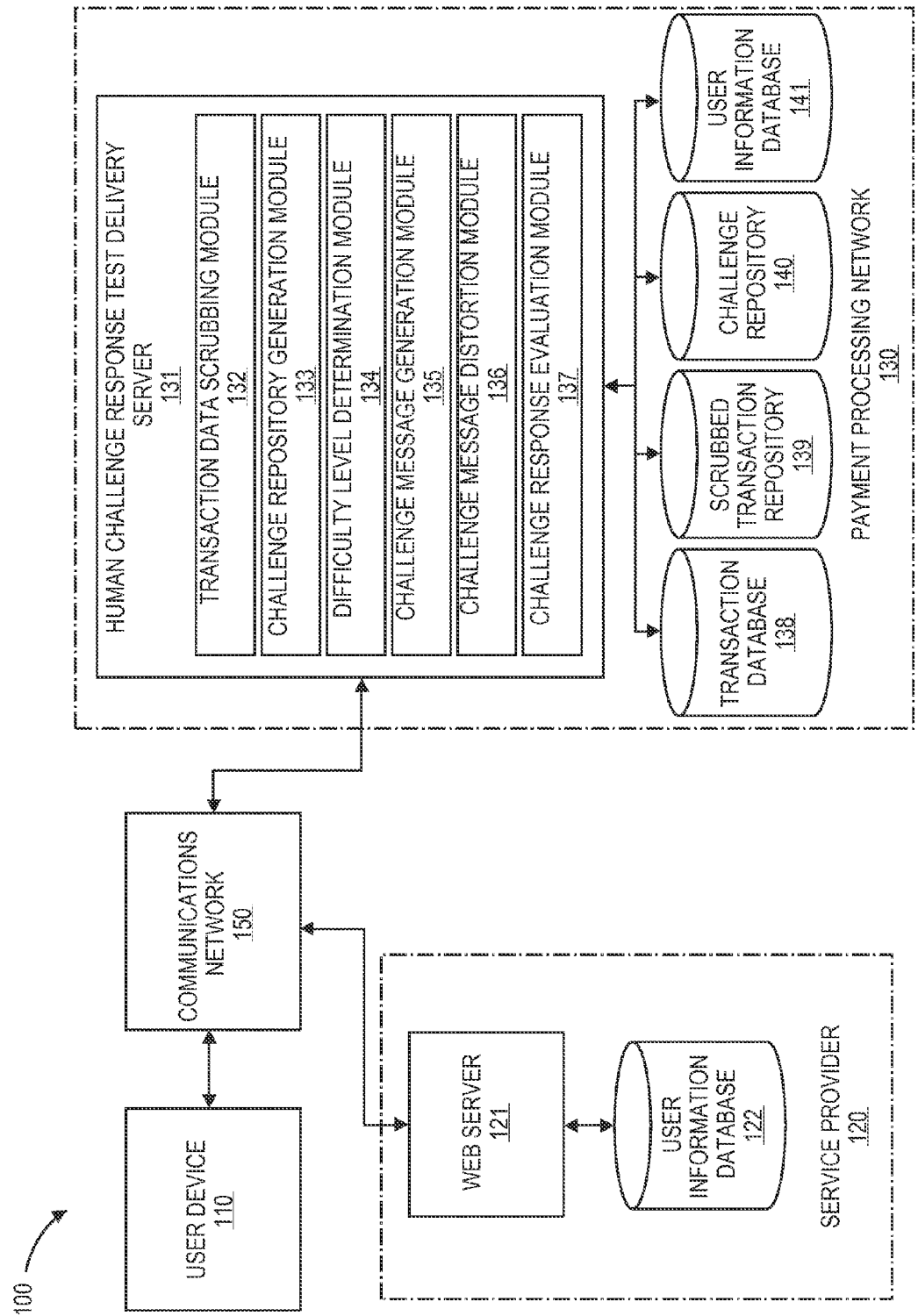
FIG. 1 shows a block diagram of a system for providing a human challenge response test delivery service according to one embodiment of the invention.

A human challenge response test is a type of challenge-response test used in computing that generates a challenge and verifies a response in an attempt to ensure that the response is generated by a human. However, challenges generated from random collections of numbers and letters can be too difficult for humans to successfully distinguish because the random collections of alphanumeric characters are not familiar to the human user. As such, human challenge response tests that generate challenge messages that include words and symbols familiar to humans but still random or diverse enough to ensure the system is effective against automatic programs are desirable. As such, one embodiment of the present invention may use transaction data associated with transactions initiated in the geographic area where the user is located, in order to provide familiar and dynamic human challenge response tests to a user. The human challenge response test delivery service may be associated with a payment processing network (or other financial entity) that may deliver challenge messages based on dynamic, ever-changing transaction data that may limit the ability to hack or crack a human challenge response test system while incorporating familiar content to users. Accordingly, a more secure, more effective, and more efficient human challenge response test delivery system may be implemented.

By associating a human challenge response test delivery service with a payment processing network, a dynamic challenge repository may be created from transaction data that is generated constantly. The vast amount of transaction data that is sent to and from payment processing networks (or other financial entities) provides sufficient random data that it may be very difficult for a computer system to determine enough random combinations of the data to solve, map, hack, or crack a human challenge response test delivery service. Additionally, embodiments that may use localized or personalized transaction data that is associated with a user or a user's geographic location, the human challenge response test delivery service may generate familiar challenge messages that may result in a more effective human challenge response test.

Additionally, in another embodiment of the present invention, a human challenge response test delivery system may be used in a method to mutually authenticate a user to a service provider and a service provider to a user. Accordingly, if the user passes a human challenge response test, the user may be authenticated to a service provider as being the user associated with a particular account and therefore, the service provider may provide the user access to a requested web portal, secure area, or secure information. Furthermore, because the human challenge response test challenge may be based on information that only the service provider may have access to, the user may authenticate the service provider as being the legitimate service provider and not a malicious third party attempting to complete a spoofing attack or presenting themselves to be a service provider they are not in order to receive sensitive information from the user. Additionally, the user may be authenticated as a human, so that the service provider knows the user is not an automated program that gained access to a user's secure information. As such, authenticating through the use of a human challenge response test may accomplish mutual authentication between the user and a service provider as well as authenticating the user is a human, in fewer steps than currently required by methods of mutual authentication with human challenge response tests. Additionally, the transaction data used in generating the challenge messages may be familiar to the user and could raise the probability that the user may be able to determine the correct challenge, without providing an automated program any advantage as the information is no more familiar to the automated program.

Prior to discussing exemplary embodiments of the invention, a further description of some terms can be provided for a better understanding of the invention.

According to embodiments of the present invention, "transaction data" may include any information associated with a transaction. For example, transaction data may include any data that is generated in response to a transaction being initiated at a merchant access device, through a computer for an e-commerce transaction, or through any other communication between entities related to a transaction. For instance, exemplary transaction data may include a merchant name, time, data, transaction amount, address, zip code, consumer name, or any other information that may be generated when a consumer performs a transaction. Additionally, transaction data may refer to any information corresponding to or describing purchases, orders, invoices, payments involving goods, items, services, and/or the like, and may include, but is not limited to, a purchase amount, a merchant identifier, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, confirmation numbers, order numbers, cancellation numbers, shipment status updates (e.g., order being processed, shipped, delivered, on back order, etc.), delivery tracking numbers, cancellation notices, updates, and/or the like.

Further, any type of transaction may be sufficient to create transaction data including a payment transaction, an authentication transaction, or any other type of transaction where information is generated and shared between two entities. Accordingly, embodiments of the present invention are not limited to payment transactions. Furthermore, transaction data may be generated through any suitable manner, including the swiping of a personal credit card at a merchant terminal (i.e., the generation of an authorization request message as well as an authorization response message) or through the initiation of a transaction using a contactless payment card or mobile payment application operating on a mobile communication device. Additionally, transaction data may be provided by any suitable method or from any entity. For example, a payment processing network, issuer, acquirer, authentication service, or any other entity that is privy to information generated during a transaction, may store and deliver transaction data to be used in embodiments of the present invention.

In some embodiments, transaction data can be created during a transaction, such as a credit or debit transaction. In such a transaction, the transaction data may be generated using the following process. First, a consumer (e.g., the user) may present his or her payment device (e.g., credit or debit card) to an access device to pay for an item or service. The payment device and the access device may interact such that information from the payment device (e.g., primary account number (PAN), verification value(s), expiration date, etc.) is received by the access device (e.g., via contact or contactless interface). The merchant computer may then receive this information from the access device. The merchant computer may then generate an authorization request message that includes the information received from the access device (i.e., information corresponding to the payment device) along with additional transaction data (e.g., a transaction amount, merchant specific information, etc.) and electronically transmit this information to an acquirer computer. The acquirer typically represents, and vouches for, the merchant in financial transactions (e.g., credit card transactions). The acquirer computer may then receive, process, and forward the authorization request message to a payment processing network for authorization.

In general, prior to the occurrence of a credit-card transaction, the payment processing network may implement an established protocol with each issuer on how the issuer's transactions are to be authorized. In some cases, such as when the transaction amount is below a threshold value, an authorization module of the payment processing network may be configured to authorize the transaction based on information that it has about the user's account without generating and transmitting an authorization request message to the issuer computer. In other cases, such as when the transaction amount is above a threshold value, the payment processing network may receive the authorization request message, determine the issuer associated with the payment device, and then forward the authorization request message for the transaction to the issuer computer for verification and authorization. As part of the authorization process, the payment processing network or the issuer computer may analyze a verification value or other datum provided by the payment device. The verification value may be stored at the issuer or the payment processing network (e.g., in one of the databases). Once the transaction is authorized, the issuer computer may generate an authorization response message (that may include an authorization code indicating the transaction is approved or declined) and transmit this electronic message via its external communication interface to payment processing network. The payment processing network may then forward the authorization response message via a communication channel to the acquirer computer, which in turn may then transmit the electronic message to comprising the authorization indication to the merchant computer.

When a user wishes to make an online purchase with a merchant over the Internet (i.e., e-commerce), a similar method as described above may be performed except that the user may use his computer apparatus or mobile device to provide information associated with a payment device (e.g., account number, user's name, expiration date, verification value, etc.) into respective fields on the merchant's checkout page (e.g., functioning as an access device). The access device may then provide this information to the merchant computer, and steps may be performed.

Using transaction data that is generated from payment transactions including credit or debit transactions processed through a payment processing network may be desirable because payment processing networks are located at a desirable and advantageous position in the payment process. As such, a payment processing network may act as a switch between the various financial and payment entities involved in the transaction and may have access to an incredible amount of transaction data. The transaction data from these payment transactions may be constantly refreshed, incredibly varied including a large amount of different types of information, easily transportable meaning that a payment processing network may easily bundle and send authorization request messages and authorization response messages to other entities, and may be easily filtered, targeted, or otherwise organized by the payment processing network or other financial entity.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, an "issuer" may typically refer to a business entity (e.g., a bank or other financial institution) that maintains financial accounts for the user and often issues a payment device such as a credit or debit card to the user. As used herein, a "merchant" may typically refer to an entity that engages in transactions and can sell goods or services to the user. As used herein, an "acquirer" may typically refer to a business entity (e.g., a commercial bank or financial institution) that has a business relationship with a particular merchant or similar entity. Some entities can perform both issuer and acquirer functions.

A "challenge repository" may include any storage medium where challenge items may be stored and accessed by a server computer. For example, the challenge repository may include a database of challenge items extracted from transaction data. Additionally, a challenge repository may be personalized such that the challenge repository is generated using information associated with a particular person or entity. For example, a challenge repository may be generated for a particular user using information that is likely to be personally relevant to the user. For instance, the challenge items in the personal or user challenge repository may be extracted from transactions the user or consumer initiated including merchant names, transaction amounts, addresses, zip codes, etc. The user may be more likely to recognize and be familiar with this personally relevant information due to the user's experience with that information previously. Furthermore, the challenge repository may be organized in any suitable manner including a single master challenge repository including general challenge items from all transaction data as well as a personal challenge repository for each user or each personal challenge repository may be stored separately.

Additionally, the challenge repository may be dynamic such that the challenge items in the challenge repository may be updated at any time. For example, a challenge repository may be updated with new extracted challenge items periodically (based on a predetermined time period), every time a challenge request is received, when another event related to an account occurs (e.g., a change of address, password, new account number, etc.) or other event occur. Additionally, a challenge repository may be constantly updated and may be based off of a real-time transaction data flow from a payment processing network. In the real-time transaction data flow, the challenge repository may include the challenge items that are used in the challenge message. Accordingly, the challenge repository may include a challenge message that is being used in a test challenge. Furthermore, the dynamic challenge repository may be updated at random intervals or at any other interval as dictated by the test delivery server.

Furthermore, each challenge item may be stored in a challenge repository according to the challenge item's complexity. The complexity of a challenge item may be determined by the length of the challenge item (i.e., the number of alphanumeric characters in the challenge item), the frequency with which the challenge item is found in the transaction data (e.g., how common the word, symbol, or number is encountered in transaction data), the type of challenge item (e.g., challenge items created from transaction amounts may be easier to decipher for a human than merchant names), whether the challenge item is in a foreign language or comprises uncommon symbols, or any other characteristics about the challenge data that may affect a user's ability to recognize the challenge item.

A "human challenge response test delivery service" may include any entity that provides human challenge response tests to a requestor or user. In some embodiments, the human challenge response test delivery service may include a server computer that is associated with a payment processing network and is configured to receive a challenge message request, respond with a distorted challenge response, receive a challenge verification request, and send a challenge verification response indicating whether the challenge verification request matches the challenge message. In other embodiments, the human challenge response test delivery service may include a server computer and may be associated with a service provider. In these embodiments, the human challenge response test delivery service may receive a user identifier, identify a challenge repository associated with the user, and may provide a distorted challenge message along with a challenge question to a user device that may be used to authenticate the user. Either way, the human challenge response test delivery service may provide a distorted challenge message to a user device or requestor, may evaluate a response to the distorted challenge message against an undistorted challenge message comprising one or more challenge items, and authenticates the user as human (or a particular human) depending on the response of the user.

According to embodiments of the present invention, a "challenge item" may include any information that may be extracted from transaction data. For example, a challenge item may be a time, date, or origination address of a transaction. Additionally, a challenge item may include the primary account number (PAN), expiration date, or any other payment information used in a transaction. Accordingly, any information included in or associated with transaction data may be used as a challenge item. However, the challenge items may not include personally identifiable information (PII) or personal account information (PAI). Accordingly, the PII and PAI may be removed (i.e., "scrubbed") from the transaction data either before the human challenge response test delivery system receives the transaction data or the PII and PAI may be removed as part of the extraction process by the human challenge response test delivery service. In some embodiments, portions of PII and PAI information may be used in the extraction process to create challenge items that are not PII or PAI. For example, the first eight digits of an account number that is 16 digits long and the first four digits of a street address may be used as challenge items because they are not PII or PAI when taken out of context of the rest of the transaction data.

Additionally, in some embodiments, a challenge item may include personal user information or user account information that a service provider that has a pre-existing relationship with a user may have access to. As such, the challenge item may be used to authenticate a service provider or other entity providing the challenge item because the challenge item is recognized by the user as comprising personal or account information that a malicious third party most likely does not have access to. The personal challenge item may be personal to the user (e.g., a date of birth, a portion of home address, a phone number, or any other personal information), may be associated with the user (e.g., previously unrelated information that the user selects as part of a registration process, for example, a selected phrase, picture, or word), an answer to a predetermined question (e.g., mother's maiden name, first dog's name, etc.), or any other information that a user may recognize as familiar and may authenticate the service provider as legitimate (e.g., information related to the previous five transactions initiated by a user). Accordingly, the challenge items may be selected from a personal or user challenge repository that includes challenge items extracted from personal or user account information. Accordingly, the user challenge repository may include challenge items comprising account information associated with a user identifier or transaction data associated with a user identifier.

A "challenge message" may include any information used in a test of whether a user is a human or a computer. For example, the challenge message may comprise one or more of the plurality of challenge items from a challenge repository. Further, the challenge message may include an image that is rendered to display the selected challenge item in an image format. Additionally, the challenge message may be distorted to create a distorted challenge message. The distorted challenge message may then be delivered by the human challenge response test delivery service server computer to a requestor or user device. The distorted challenge message may comprise a distorted image of the underlying challenge items such that it may be difficult to decipher the underlying one or more challenge items.

Figure 4A:
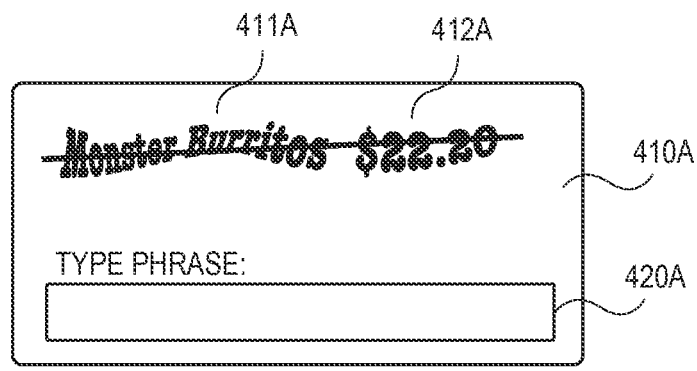
FIGS. 4A-4D show exemplary distorted challenge messages that may be delivered to a user device according to exemplary embodiments of the present invention.

For example, using the example shown in FIG. 4A, the challenge items may include a merchant's name (e.g., "Monster Burrito") and a transaction amount (e.g., $22.20). The challenge items may be extracted from transaction data that may be associated with a single transaction (e.g., a transaction for $22.20 at Monster Burrito) or two separate transactions (e.g., a transaction initiated at Monster Burrito and a separate transaction for an amount of $22.20 initiated elsewhere or initiated at Monster Burrito but during a separate transaction). As can be seen from FIG. 4A, the text of the distorted challenge message may be distorted such that it may be difficult to identify the identity of the text corresponding to the one or more challenge items. The distorted challenge message may be difficult to read by a human but may be much harder or nearly unsolvable by a computer program. However, by using familiar information (e.g., a merchant's name and a transaction amount), the user may more easily decipher the one or more challenge items within the distorted challenge message and more easily pass the human challenge response test by responding with the correct information. Additionally, in some embodiments, the transaction may have been initiated by the user or by others in a location near the user. Accordingly, the user may be familiar with the merchant or may have completed a transaction for the amount in the distorted challenge message. Accordingly, the user may more successfully identify the underlying challenge items in the distorted challenge message and be correctly identified as a human.

As used herein, "extracting one or more challenge items from the transaction data using an extraction algorithm," may include any suitable method of removing information from transaction data. For example, an extraction algorithm may be used that selects challenge items from transaction data based on a predetermined criteria, including, for instance, the type of transaction data (e.g., merchant name, last four digits of a primary account number, address of a merchant, transaction amount, date, etc.). The extraction algorithm may use any predetermined criteria when selecting and extracting challenge items from the transaction data including the type of transaction data (e.g., merchant name, address, etc.), when the associated transaction occurred, the location where the associated transaction was initiated (for example, using a merchant zip code), the frequency of use as a challenge item or how often the information has been used by the extraction module as a challenge item in the past, etc.

In some embodiments, all of the usable information (e.g., no PII or PAI data or unrecognizable information) associated with a single transaction may be extracted from the transaction data (e.g., every piece of information that may be used from a single transaction may be selected). Alternatively, in other embodiments, only one piece of data may be extracted from the transaction data for any single associated transaction (e.g., a merchant name may be extracted from the transaction data as being associated with one transaction and a transaction amount may be extracted from transaction data associated with another transaction). Furthermore, the challenge items may be assigned a difficulty rating or complexity rating based on the length and content of the extracted challenge item. For example, if the merchant name is ten characters long, includes foreign language characters, and is rarely encountered by the human challenge response test delivery service, the extracted challenge item may be given a higher complexity rating than a shorter, domestic language based, and common merchant name. Any suitable complexity rating scale may be implemented including, for example, a scale of 1-10, a scale based on characters A-F, or any other suitable scale. Accordingly, the extracted challenge item may be associated with a complexity rating that may be stored with the challenge item in the challenge repository. Furthermore, the complexity rating may be used as a predetermined criterion in the extraction algorithm, such that only a challenge item of a certain complexity rating may be extracted from the transaction data.

In some embodiments of the present invention, "extracting one or more challenge items from the transaction data" may include determining a location of a user and extracting the one or more challenge items from transaction data associated with transactions initiated near the location of the user. Any suitable method for determining a location of a user may be used. For example, the requestor may send information related to the location of the user (e.g., a zip code, a "cookie" including the IP address of the user device, address information from a user information database associated with the user, global positioning service (GPS) information from a user device, or any other location based information). Using the location information, the human challenge response test delivery service may limit, filter, or scrub the transaction data to include only data associated with the user's location. For example, the transaction data may be filtered to only include transactions that were initiated from the same zip code as the user's home address or the IP address that the user device is using to contact the service provider or human challenge response test delivery service. Any other suitable information may also be used to limit the transaction data to those transactions or information that may be familiar to the user. For example, the transaction data may be limited to only those transaction that were initiated by the user or by members of the user's family or household. Any other suitable limitation may be implemented to filter the transaction data or scrub the transaction data of unrelated transactions.

As used herein, "distorted challenge messages" may include a challenge message that has been distorted to ensure that a computer program cannot easily decipher the underlying one or more challenge items of the challenge message. The distorted challenge message may render a distorted image of the challenge message or the distorted challenge message may distort the earlier rendered challenge message. The distorted challenge message may be provided by a human challenge response test delivery service to a user computer or a requestor as part of a human challenge response test.

Furthermore, the challenge message may be distorted according to a difficulty level. As such, the distorted challenge message may include high amount of distortion if the difficulty level is high and a low amount of distortion if the difficulty level is low. As used herein, a "difficulty level" may include any indicator of a level of complexity for a human challenge response test. Additionally, the difficulty level may be determined for a challenge message request through any suitable method. For example, the difficulty level may be determined from an alphanumeric character or characters included in a challenge message request that may indicate to the human challenge response test delivery system how difficult the challenge message should be (e.g., a difficulty level of 8 out of 10 would indicate a relatively high difficulty level). Furthermore, the difficulty level may be determined based on a security level of a request or requestor. For example, the requestor information may include the identity of the requestor (e.g., the name of a merchant or service provider), a type of service provided by the requestor (e.g., the requestor is a bank versus an online encyclopedia), or the location of the requestor (e.g., the IP address of the requestor is from a secured area or a location with heightened security needs). For instance, human challenge response tests requested by a secure bank issuer website or a secure government web site may have a higher security level based on the identity of the requestor.

Accordingly, the human challenge response test delivery service may store a security setting for the requestor during a registration process or the requestor may include a difficulty level in the request. Therefore, the human challenge response test deliver service may send challenge messages as easy or as difficult as a requestor may like. For example, a website that does not contain private or secure information may have a low security level associated with it and therefore may opt for a low difficulty level. Therefore, the distorted challenge messages that may be sent in response to the requestor's challenge message request may include a single word and a low level of distortion. However, in the case of a user trying to gain access to their secure information from a bank or issuer website, a medium to high security level may be set for the bank, and the user may be sent a distorted challenge message with five challenge items and a large amount of distortion applied to the challenge message.

Further, the difficulty level may determine the amount of distortion that may be applied to a challenge message image, the number of challenge items included in the challenge message, and/or the number of false challenges that may be included in a challenge message. Additionally, the complexity level of the selected challenge items may be determined by the difficulty level. For example, challenge items that are long, multiple words, in a foreign language, or very rare may be considered to be more complex and challenge items may be stored by complexity using a complexity rating in a challenge repository. Accordingly, the difficulty level may indicate the level of complexity for the selected challenge items in the challenge message.

A "challenge message request" may include any communication from a user or requestor that indicates that the user or requestor is requesting a human challenge response test. The challenge message request may be sent from a requestor server (e.g., a service provider web server) or a user device. The challenge message request may comprise any suitable format and may include personal information about the requestor, user device, or other entity (e.g., user device location, a "cookie" associated with the user device, or any other information). Alternatively, in some embodiments, the challenge message request may only include a request indicator.

A "requestor" may include any entity associated with a user device. For example, a requestor may be service provider that was contacted by the user device, a web provider of a service provider, a user device, or any other entity. Furthermore, the requestor may send a web server response to a user device in response to a request for access to a user information database of a service provider. The web server response communication may include computer code including an application programming interface (API) provided by the human challenge response test delivery server that connects the user device to the human test response test delivery server and provides the human challenge response test functionality. Additionally, the human challenge response test delivery server may communicate directly with the web server such that the web server relays communications from a user device to the human challenge response test delivery server and vice versa. The user device, web server, and human challenge response test delivery server may communicate through a communications network using any suitable communications protocol (e.g., TCP/IP, a wireless communications protocol, etc.).

A "challenge verification request" may include any response to the distorted challenge message sent from a user or a service provider. The challenge verification request may include an answer by the user to the distorted challenge message or challenge question, depending on the embodiment of the invention. For example, in response to the human challenge response test delivery service, the challenge verification request may include a user's best guess at the contents of the distorted challenge message and as such, may include a verbatim copying of the challenge items presented in the distorted challenge message. Alternatively, the challenge verification request may include an answer to a challenge question and as such, only includes a single word (or words) that attempt to decipher the sole challenge item in the distorted challenge message. Accordingly, the verification request message may include multiple words or a single word corresponding to the number of challenge items included in the distorted challenge message.

In embodiments of the present invention, "determining whether the challenge verification request matches the challenge message," may include any method of comparing the received challenge verification request to the challenge items in the challenge message. For example, the human challenge response test delivery service may match the challenge verification request exactly with the one or more challenge items in the challenge message and may only respond successfully if the match is exact. Alternatively, the service may also make estimations and calculations based on how close the response is to the underlying message. For example, letters that are very close to each other may be used interchangeably in responses or other common mistakes made by humans may be accounted for in the evaluation process.

A "challenge verification response" may include any communication from a service provider or human challenge response test delivery service that indicates whether the user correctly responded to the distorted challenge message. For example, in embodiments implementing the familiar dynamic challenge repository, the challenge verification response may include a message sent to the requestor indicating whether the user accurately recreated the one or more challenge items in the distorted challenge message. For instance, the challenge verification response may include a true if the challenge verification request matched the challenge message, and a false if the challenge verification request did not match. Any other suitable indicator may be used (e.g., yes, no, user information, a password, etc.). Alternatively, in embodiments implementing mutual authentication, the challenge verification response may indicate that a user is authenticated if the verification request message or challenge response includes the correct challenge item from the distorted challenge message including one or more false challenges. If so, the system may authenticate the user as both a human and a particular user associated with a user identifier.

A "user identifier" may include any message, symbol, alphanumeric characters, or other information that uniquely identifies a user. For example, the user identifier may be a username, account number, personal information (name, home address, social security number, etc.), or any other information that may allow the service to identify a particular challenge repository or user information database associated with that user.

The user identifier may be used to determine a challenge repository associated with a user. As used herein, "determining a challenge repository associated with a user identifier," may include any actions that identify or generate challenge items that are associated with a user identifier. For example, determining a user challenge repository may include accessing a user information database associated with a user account at a service provider that comprises personal and account information associated with the user. For instance, prior transactions initiated with the service provider, home address, phone number, challenge question answers, or any other stored information associated with the user may be used to generate challenge items and may be placed in a challenge repository associated with the user (i.e., a user challenge repository), or otherwise identified as being associated with the user. The user challenge repository may be generated during an enrollment with the service provider, may be generated in real-time each time a user tries to access secure information, or may be generated at any other suitable time (e.g., periodically).

As used herein, a "challenge question" may include any information that may provide a hint to a user of a correct challenge item within the distorted challenge message. For example, challenge questions may include "What is the name of your first dog?," "What is your mother's maiden name?," "What is the last four digits of your phone number?," or any other information that may inform the user of the correct challenge item in a distorted challenge message. In some embodiments, the challenge question may not include a specific question and instead may direct the user to select a particular statement, entry, or any other information into a response section. For example, the challenge question may include a statement, such as, "Enter any of the entries that you recognize as being associated with your account," or any other indicator to a user that they should enter a particular response. Additionally, a challenge question may be associated with the challenge item that is selected for a challenge message, such that the challenge item is a reasonable and correct answer to the challenge question. For example, while a challenge repository associated with a user identifier is being generated, the challenge items may be stored with a challenge question identifier that informs the server computer of which challenge question is associated with the challenge item.

Furthermore, the challenge question may be associated with a particular set of false challenges or a false challenge repository such that the false challenges are associated with a selected challenge question for a challenge message. Accordingly, the false challenges may appear to be similar or related to the challenge question such that they could be reasonable answers to the challenge question. For example, for the challenge question of "What was your first dog's name?," the false challenges may be well-known or plausible dog names (e.g., Fido, Lassie, Skip, etc.). Accordingly, a malicious third party that is trying to gain access to the service provider may not know the correct answer as the multiple options sound like reasonable answers to the question. Accordingly, each time a challenge question is sent to a user, there should be different false challenges associated with the challenge question such that a provider cannot continue to test the system with trial and error until they determine the correct answer. Further, the system should provide a large number of challenge questions and corresponding challenge items, such that the same question is not asked frequently. Accordingly, it may take a large number of attempts for a challenge question to be re-asked, and the challenge message may include some overlapping false challenges so that it is not easy to determine which answer is correct through trial and error.

As used herein, a "false challenge" may include any answer to a challenge question that is not the correct answer for the user identifier (i.e., the false challenge may not include the challenge item). For example, a false challenge for the challenge question, "What was your first dog's name?" could include Fido, Lassie, Skip, etc. As such, the false challenges may be plausible answers to the challenge question. Additionally, the number of false challenges may be determined by the difficulty level of the challenge message. The higher the difficulty level, the more false challenges may be included in the distorted challenge message.

I. Exemplary Systems

Embodiments of the present invention include at least two embodiments. First, embodiments of the present invention may be used to generate a familiar dynamic challenge repository including challenge items extracted from transaction data. The familiar dynamic challenge repository may exclude any personal identifiable information (PII) or personal account information (PAI) but may be familiar or personal to a user based on transaction data associated with a location of a user, a user's account, or any other familiar data source. The dynamic and familiar challenge repository may then be used to generate human challenge response test messages (i.e., distorted challenge messages) that may be sent to a user or requestor to ensure the user or requestor is human. In a second embodiment of the present invention, a challenge repository associated with a user may be used to generate human challenge response test challenge messages that provide a dual purpose of both performing mutual authentication of the user and a service provider as well as ensuring that the user is a human and not a computer program.

A. Dynamic Challenge Repository

A familiar dynamic human challenge response test delivery service can be provided by creating a dynamic challenge repository from transaction data. Transaction data is more recognizable than random data to users and can be localized to the user to familiarize the transaction data to merchants, addresses, and information that may be more familiar and recognizable to the user. Payment processing network operators and other financial entities receive gigabytes of transaction data every day through their payment processing transaction systems. The transaction data may be stored in transaction databases that hold vast amounts of transactional data. The transaction data can include thousands of merchant names, currency codes, amounts, country codes, states, zip codes, dates, times, terminal identifiers, etc. The amount of transaction data received every day is sufficiently large and sufficiently random that it may be very difficult for anyone with malicious intent to circumvent challenges randomly generated from the transaction data. Furthermore, the data is updated every day (or other period) so that even if the system was circumvented for a particular day, the database of challenge information may be dynamic and thus continually updated. Accordingly, the system may not be compromised even if a hacker gained access to the database at any given time. Therefore, transaction data from a payment processing network (or other financial entities) may include a constantly refreshed source of data that is of a tremendous size and may be filtered to be localized, personalized, or otherwise limited to the purposes of a human challenge response test delivery service.

The human challenge response test delivery service may cleanse the transaction database of any personally identifiable information (PII) and use the data to create human challenge response tests of various degrees of difficulty. Challenges of various degrees of difficulty could be created by extracting certain types of transaction data from the cleansed transaction database. Furthermore, the system could be configured in a manner that only sends a challenge of a particular difficulty level depending on the character of the data on the website that the user is trying to access. For example, websites with only minimal security information available (e.g., a website providing publicly available information) may request an easier challenge than a website providing personal or financial information (e.g., a user's personal bank account information).

Furthermore, the transaction data can be localized or personalized to a user to provide even more familiarity. The transaction data could be localized by filtering the available transaction data to that data that was generated from transactions associated with a geographic location which is associated with a user, such as transactions in or within a predefined radius of the zip code from which the user is requesting access. For example, in some embodiments, distorted challenge messages may be delivered in response to an online internet request on the world wide web. A web server could determine the internet protocol (IP) address of the user device requesting access to the website. As such, the web server could request a human challenge response test distorted challenge message that is generated from transaction data that is only from a zip code associated with the requestor user's IP address. Additionally, with the increase in mobile world wide web use, this IP address feature may be useful to provide familiar localized data to a user even if they are outside of their typical geographic location.

FIG. 1 shows a system 100 for providing a human challenge response test delivery service according to one embodiment of the invention. As explained above, some embodiments may implement the system 100 such that the web server 121 comprises some or all of the human challenge response test delivery service system including the server 131 and databases 138-141. The system 100 may include a user device 110, a service provider 120, and a separate human challenge response test delivery server 131 that may be located at a payment processing network 130. In alternative embodiments, the human challenge response test delivery server 131 may be located at the service provider 120 or at another separate third party.

A service provider 120 may include a web server 121 and a user information database 122. A user device 110 may contact the web server 121 through a network connection 150 to gain access to a website provided by a service provider 120. The service provider 120 could be a financial institution, government organization, membership organization, or any website operator that provides information on the internet. The service provider 120 may want to incorporate a human challenge response test delivery service to limit access to only those user devices 110 that are being controlled by present human beings so that the service provider's 120 web server 121 is not bombarded by requests from automatic scripting attacks or other computer programs. Requests from automatic computer programs can slow down the web service for other users or cause a threat to the security of the system and therefore, it may be desirable to limit automated computer programs from accessing the web server 121.

The user device 110 may include any device that may communicate with another entity. For example, the user device may include a computing device (e.g., a laptop or tablet computer), a cellular device (e.g., a phone or smartphone), a personal digital assistant (e.g., a Blackberry™ device), a computer, or any other device capable of receiving and sending communication messages.

The communications network may include any wired or wireless network capable of sending and receiving communications messages between entities. For example, the communication network 150 may include the internet, a wireless or mobile communication network, a telephone network, or any other suitable network of computers or physical medium capable of transporting electronic messages between entities. As would be understood by one of ordinary skill in the art, any suitable communications protocol for storing, representing, and transmitting data between components in the system may be used. Some examples of such methods may include utilizing predefined and static fields (such as in core TCP/IP protocols); "Field: Value" pairs (e.g. HTTP, FTP, SMTP, POP3, and SIP); an XML based format; and/or Tag-Length-Value format.

The payment processing network may include any entity that processes transactions. The payment processing network may include data processing subsystems, networks, and operations used to support and deliver authorization services, exception file services, and clearing and settlement services. For example, the payment processing network may comprise a server computer, coupled to a communications network interface (e.g., by an external communication interface), and a database(s) of information. An exemplary payment processing network may include for example, VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet. Although many of the data processing functions and features of some embodiments may be present in the payment processing network (and a server computer therein), it should be understood that such functions and features could be present in other components such as the service provider web server computer, and need not be present in the payment processing network, or a server computer therein.

A human challenge response test delivery server 131 may include a plurality of modules in order to deliver and evaluate human challenge response tests. For example, the human challenge response test delivery server 131 may include a transaction data scrubbing module 132, a challenge repository generation module 133, a difficulty level determination module 134, a challenge message generation module 135, a challenge message distortion module 136, and a challenge response evaluation module 137. Additionally, the human challenge response test delivery server 131 may include a plurality of databases including a transaction database 138, scrubbed transaction repository 139, a challenge repository 139, and a user information database 140. In the exemplary embodiment shown in FIG. 1, the human challenge response test delivery server 131 is shown as part of the payment processing network. However, the challenge response test delivery server 131 may be located at any other entity or by itself in alternative embodiments as long as the server has access to transaction data to be used in generating a challenge repository as described herein.

The human challenge response test delivery server 131 may include a server computer or group of server computers that may communicate through a communications network 150. The web server 121 managed by the service provider 120 may send a request through the communications network 150 to the human challenge response test delivery server 131 managed by a payment processor network 130. The human challenge response test delivery server 131 may access data from a transaction database 138 that is constantly updated with transaction data from the transactions the payment processing network 130 processes between merchants, acquirers, and issuers (not shown).

As used herein, a "server computer" is typically a powerful computer or cluster of computers. For example, the server computer can be a large mainframe, a minicomputer cluster, or a group of servers functioning as a unit. In one example, the server computer may be a database server coupled to a web server.

A transaction data scrubbing module 132 may include any software or hardware module operating on the human challenge response test delivery server 131. The transaction data scrubbing module 132 may access transaction data associated with a plurality of transactions from a transaction database 138 or real-time stream of transaction data and may scrub the data of any personal identifier information (PII) or personal account information (PAI). Additionally, the transaction data scrubbing module 132 may apply any filters to the transaction data that are appropriate. For example, the transaction data scrubbing module 132 may remove all information that is not easily recognizable by a user. For instance, the check error digit, parity bit, or any other maintenance information may be removed for the transaction data if the transaction data is created from authorization request messages and authorization response messages. The transaction data scrubbing module 132 may also limit the transaction data to transactions that are familiar to the user. For example, transaction data may be limited to data that is associated with transactions that are generated within a particular distance from the location of a user or to transactions initiated by a user previously.

A user information database 141 may include any memory where information may be stored and may include personal or account information associated with a user. The human challenge response test delivery server 131 may use the user information database 141 to store and track information about a user and may use any unique user identifier to determine a user information database 141 associated with a user. In some embodiments, the user information database 141 may be used to generate familiar and personal challenge items that may be stored in a personal or user challenge repository (not shown).

A transaction database 138 may include any memory where information may be stored and may include any transaction data associated with a plurality of transactions. Alternatively, in some embodiments the transaction database 138 may be a live, real-time stream of data that may include current transactions being processed by the payment processing network 130. Accordingly, in some embodiments, instead of accessing transaction data in a transaction database 138, the transaction data could be streamed to the human challenge response test delivery server 131 without being stored.

A scrubbed transaction repository 139 may include any computer memory where information may be stored and may include any filtered or scrubbed transaction data. The transaction data scrubbing module 132 may create a scrubbed transaction repository 139 using the data from the transaction database 138. The transaction data scrubbing module 132 may scrub away all the personal identifiable information (PII) and any other unusable data from the transaction data stored in the transaction database 138 and store the scrubbed data in the scrubbed transaction repository 139. The scrubbed data could be stored with geographic indicators such that the data could be localized to certain zip codes or geographic locations.

A challenge repository generation module 133 may include any software or hardware module operating on the human challenge response test delivery server 131 that may be configured to generate a challenge repository 140 from the scrubbed transaction data stored in the scrubbed transaction repository 139. The challenge repository generation module 133 may create challenge items of varying difficulty and length and store those challenge items in the challenge repository 140. The transaction data scrubbing module 132 may constantly update the scrubbed transaction repository 139 with new scrubbed transaction data which the challenge repository generation module 133 may use to constantly update the challenge repository 140 with new challenge items. Alternatively, in some embodiments, all of the data scrubbing, challenge item creation, and challenge item storing could be done periodically. Accordingly, the challenge repository 140 may be dynamic and constantly or periodically being updated with new challenge items. As such, hackers or malicious third parties may not solve or map a challenge repository 140, even if they gain access to the challenge repository 140.

A difficulty level determination module 134 may include any software or hardware module operating on the human challenge response test delivery server. The difficulty level determination module 134 may determine the difficulty level associated with the challenge request using any suitable method. For example, the difficulty level determination module 134 may analyze the request for a challenge message for an included difficulty level or may identify the requestor to determine a security level that may indicate the difficulty level for a challenge request.

A challenge message generation module 135 may include any software or hardware module operating on the human challenge response test delivery server. When the human challenge response test delivery server 131 receives a request from the web server 121 for a challenge, the challenge message generation module 135 may determine one or more challenge items from the challenge repository 140 based on the requested difficulty level provided in the request and generate a challenge message. The challenge message generation module may also receive an indication of the location of the user device 110 with the challenge message request and may tailor a challenge message with challenge items from transaction data associated with transactions initiated from the surrounding geographic area to the user device 110. For example, a user device 110 accessing the web server 121 from a certain zip code may only receive challenge items including merchant names from stores or restaurants within that zip code or within a distance range from that zip code. The user's potential familiarity with the merchant name may help the user recognize the challenge items in the challenge message without providing any hints to an automated program trying to subvert the human challenge response test delivery service.

A challenge message distortion module 136 may include any software or hardware module operating on the human challenge response test delivery server 131 that is capable of distorting challenge messages. As explained above, the challenge message distortion module 136 may generate an image of the underlying challenge message and distort the image or the challenge message distortion module 136 may distort a previously generated image that was created by the challenge response generation module 135. The challenge message distortion module 136 may apply a level of distortion to the challenge message image according to a difficulty level for the challenge request. The image may be distorted through a twisting of the underlying text, dis-coloration, overlapping of images, blocking of images, the use of texture, patterns, or any other distortion, blocking, or other transformation of an image such that a computer program may not determine the underlying data. Some examples of distorted images are provided in FIGS. 4A-4D and 8A-8D. The challenge message distortion module 136 may send the distorted challenge message to the requestor or user after distorting the challenge message.

A challenge response evaluation module 137 may include any software or hardware module operating on the human challenge response test delivery server 131 configured to evaluate a received challenge response. The challenge response evaluation module 137 may be configured to receive a challenge verification request from the user device 110 or requestor (e.g., service provider 120). The challenge verification request may include a challenge response entered by the user in response to the earlier sent challenge message. Accordingly, the challenge response evaluation module 137 may evaluate the challenge response or challenge verification request and provide a challenge verification response to the web server 121 indicating whether the challenge verification request matches the challenge items in the challenge message. As explained previously, in order to match the challenge items, the challenge verification request or challenge response may not match perfectly. Accordingly, the challenge response evaluation module may implement any suitable algorithms or methods of estimating an accuracy score and may provide successful challenge verification responses for challenge responses that do not match perfectly or exactly.

If the challenge response evaluation module 137 determines that the challenge verification request including a challenge response matches the one or more challenge items in the challenge message, the challenge response evaluation module 137 may send a challenge verification response to the web server 121 to inform the web server 121 that the user device 110 is being operated by a human. However, if the challenge verification request does not match the underlying challenge message, then the challenge response evaluation module 137 may send a message to the web server 121 to inform the web server 121 that the user device 110 did not recognize the challenge.

At this point, the human challenge response test delivery server 131 may also send a subsequent challenge to the web server 121 (either in a separate message or as part of the fail message) so that the user device 110 can try to verify the challenge message and attempt to gain access again. Once it is determined that the user device 110 is being operated by a human, and the web server 121 receives a true message from the challenge response evaluation module 137, the web server 121 may provide the user device 110 access to the user account information or other secure information requested.

B. Mutual Authentication Using a Human Challenge Response Test System

Figure 2:
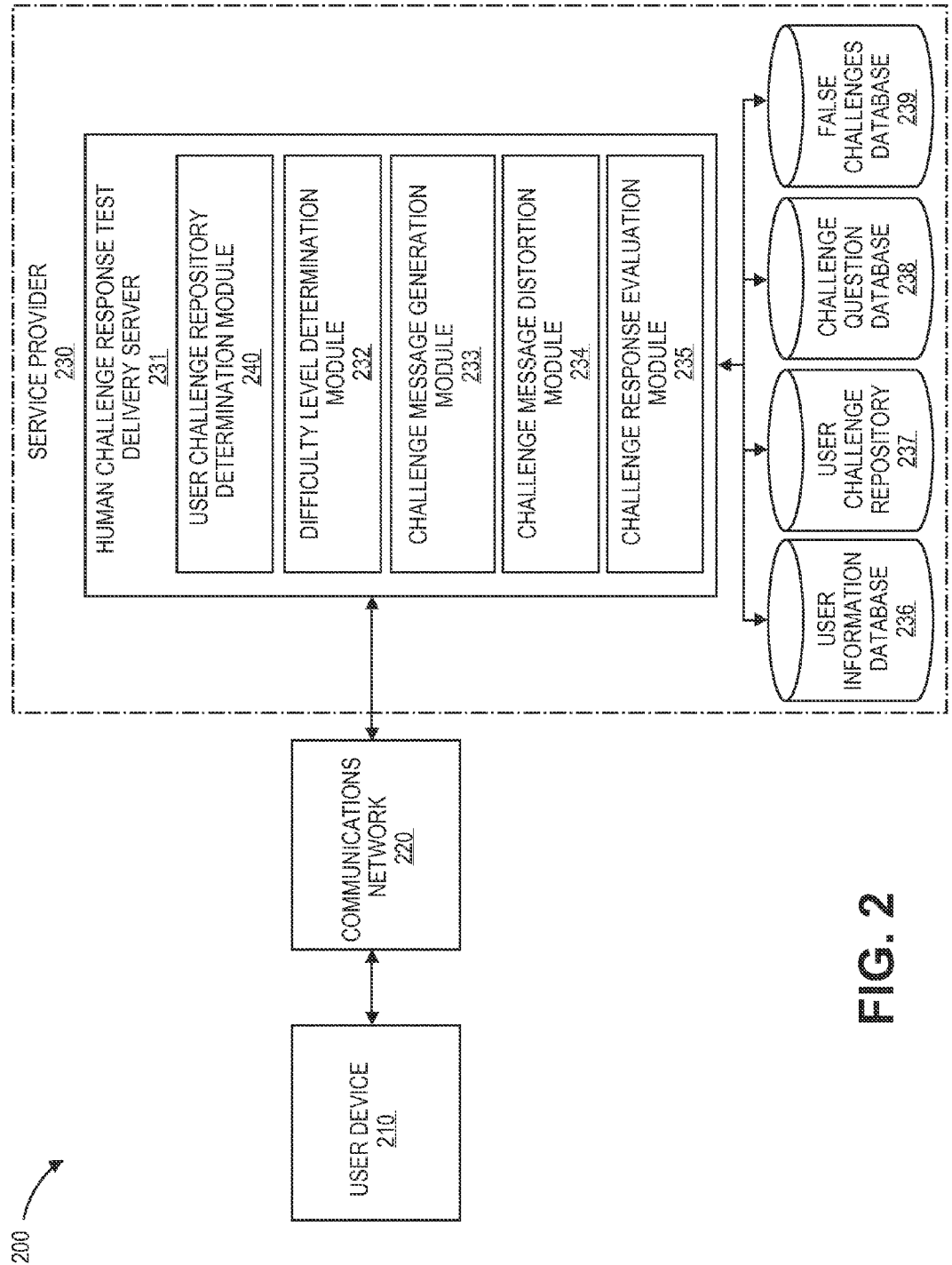
FIG. 2 shows a block diagram of a system for providing a human challenge response test during a mutual authentication process according to another embodiment of the invention.

Another embodiment of the present invention is directed to mutual authentication of two parties using human challenge response test challenges. FIG. 2 shows an exemplary block diagram of a system 200 for implementing mutual authentication using a human challenge response test delivery service. Although FIG. 2 shows the service provider 230 as comprising the human challenge response test delivery server 231, the system 200 could also be implemented as in FIG. 1 where the human challenge response test delivery server 131 is operated by a payment processing network 130. In such an embodiment, the human challenge response test delivery server 231 may still have access to a user information database 236 and the system 200 may work in a similar manner as described herein, with information being passed through the service provider 230.

In the exemplary embodiments shown in FIG. 2, a user device 210 may communicate directly with a service provider 230 through a communication network 220. However, the service provider 230 may also comprise a human challenge response test delivery server 231 as well as a user information database 236, user challenge repository 237, challenge question database 238, and false challenges database 239. The human challenge response test delivery server 231 may comprise a user challenge repository determination module 240, a difficulty level determination module 232, a challenge message generation module 233, a challenge message distortion module, and a challenge response evaluation module 235, as well as any of the same modules as the human challenge response test delivery server 131 in FIG. 1.

The user challenge repository determination module 240 may include any software or hardware module operating on the human challenge response test delivery server 131 configured to receive a user identifier and determine a user challenge repository 237 associated with the user identifier. The user challenge repository determination module 240 may generate the user challenge repository 237 from a user information database 236 or the user challenge repository 237 may previously be generated and the user challenge repository determination module 240 may use the user identifier to determine the appropriate user challenge repository 237. The user challenge repository may be generated using similar methods as those described in reference to FIG. 1 above.

The user challenge repository 237 may include any available storage area or memory that may be accessed by a server computer and may comprise challenge items extracted from a user information database 236. The user challenge repository 237 may be associated with a user identifier that is associated with the user information database 236. The challenge items may also be associated with a challenge question that is stored in a challenge question database 238. Multiple challenge items may be associated with a single challenge question or a single challenge item may be associated with multiple challenge questions.

The challenge question database 238 may include any available storage area or memory that may be accessed by a server computer and may comprise challenge questions that may be associated with challenge items from a user challenge repository 237. When a challenge item is selected to be included in a challenge message, the challenge item may be stored with one or more identifiers for challenge questions that are associated with the challenge item. Accordingly, the challenge item may be provided with a challenge question that is associated and makes sense with the challenge item.

The false challenges database 239 may include any available storage area or memory that may be accessed by a server computer and may comprise false challenges associated with challenge questions. The challenge question that is associated with the challenge item that is selected in the challenge message may also have a corresponding plurality of false challenges that may be plausible and reasonable answers to the challenge question.

The other modules and databases of FIG. 2 are similar to those explained above in reference to FIG. 1. The different functionality and uses of the various embodiments of the systems may be described in further detail below in reference to the exemplary methods implemented with the various systems.

II. Exemplary Methods

Figure 3:
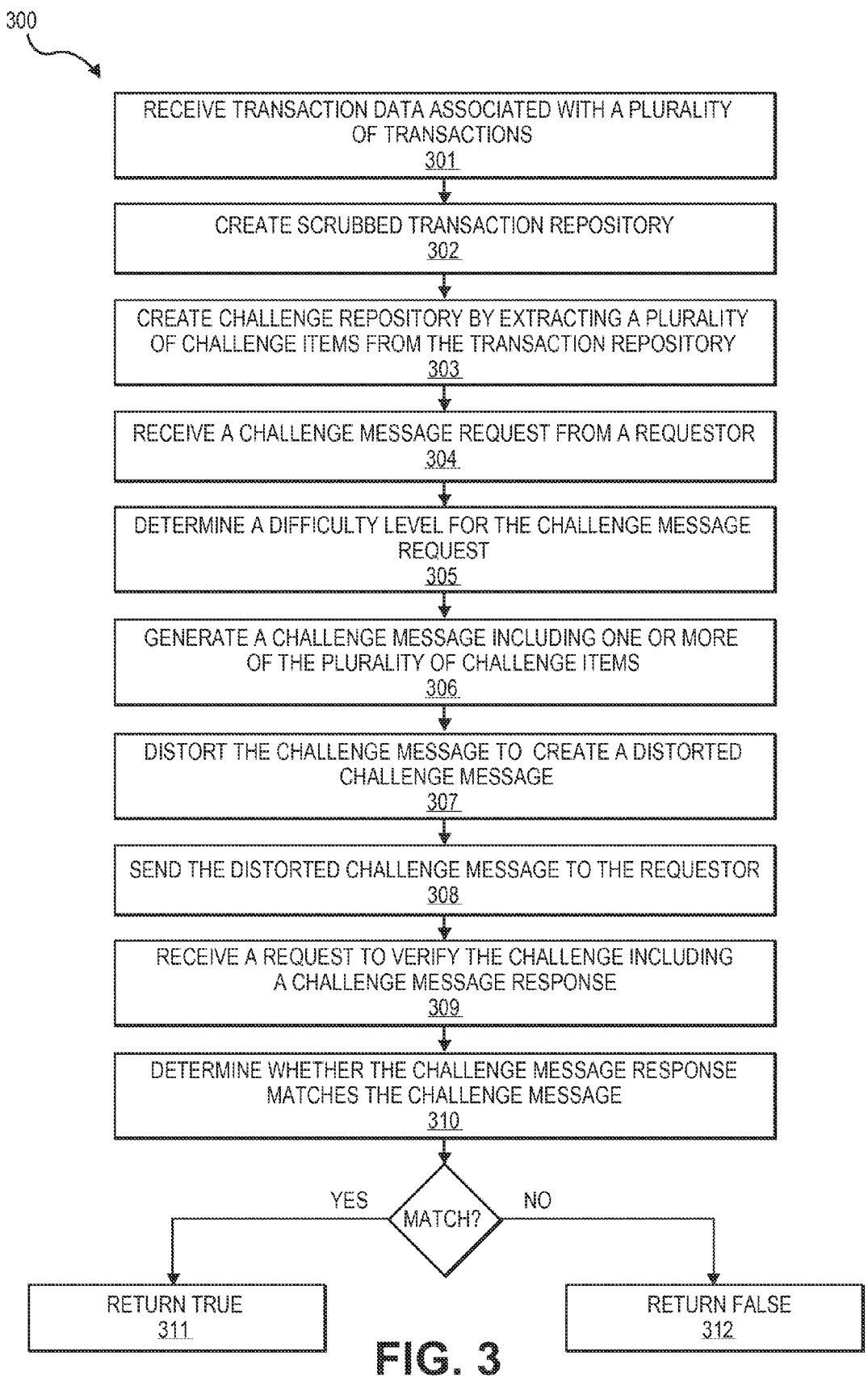
FIG. 3 shows a flow chart describing a method of providing a human challenge response test delivery service according to one embodiment of the invention.

A. Human Challenge Response Test Delivery Using Dynamic Challenge Repository FIG. 3 shows a flow chart describing a method for providing a human challenge response test delivery service according to one embodiment of the invention. Typically the method may be performed by a single human challenge response test delivery server where a web server requests the delivery service due to a user requesting to access the web server's website. The user computer, web server, and human challenge response test delivery service may be connected via an internet network or other telecommunications network. The user computer may also be referred to as an originator because the user computer originates the request to access the web server. The web server may then request that the human challenge response test delivery service verify that the user is a human and not an automated computer program. The human challenge response test delivery service may then send a challenge to the user via the web server or directly through the communication network. In some embodiments, it may also be possible for the web server to perform certain aspects of the method that are described herein as being completed by the human challenge response test delivery server.

First, in step 301, the human challenge response test delivery server computer receives transaction data associated with a plurality of transactions. The server may have a constant connection to a transaction data feed or may be periodically updated with new transaction data. The transaction data could be updated daily, hourly, or on demand when a request is sent to the delivery server. Accordingly, the transaction data may be stored in a transaction database or may not be stored at all.

In step 302, a transaction data scrubbing module may create a scrubbed transaction repository from the transaction database or transaction data. The scrubbed transaction repository could be updated daily, hourly, on demand when a request is sent to the delivery server, or any other suitable time. The delivery server could capture and scrub a large set of unique transactions from a payment processor or other financial entity's transactional systems or may select small portions of a payment processing networks transaction database. The transaction database may be scrubbed by pulling desired types of information from the transaction data and discarding other data such that no unnecessary information may be kept. For example, all personal identifiable information (PII) and personal account information (PAI) may be removed from the transaction data.

Next, in step 303, the challenge repository generation module may create a challenge repository by extracting challenge items from the scrubbed transaction repository using an extraction algorithm. Any suitable method may be implemented to extract challenge items from the scrubbed transaction data. For example, an extraction algorithm may select a plurality of challenge items of various difficulty and length. The extraction algorithm may select and extract challenge items using any other predetermined criteria. The challenge items may be stored by a difficulty rating or complexity rating such that they can easily be provided upon request for a challenge and may be provided according to a difficulty level setting, complexity rating, or other complexity measurement or indication.

In step 304, the human challenge response test delivery service receives a challenge message request from a requestor. The request can come from any entity with a network connection to the server providing the human challenge response test delivery service and may be requested on behalf of a user. Additionally, the user may be provided with a web server address to request the challenge message directly from the user device.

In step 305, a difficulty determination module determines a difficulty level for the challenge message request. The challenge message request may contain a desired difficulty level so that the requestor can tailor the difficulty level to their particular security needs or the server may have a stored security level associated with the requestor and may determine the difficulty level from the stored security level.

In step 306, the challenge message generation module may create a challenge message including one or more of the plurality of challenge items from the challenge repository. The challenge message may comprise an image containing the one or more challenge items that is generated from the challenge repository.

In step 307, the challenge message distortion module distorts the generated challenge message to create a distorted challenge message. The amount of distortion applied to the challenge message may be based on the determined difficulty level. Accordingly, a distorted challenge message image can have varying amounts of distortion applied to the underlying image corresponding to the one or more challenge items. For example, a low difficulty level may only provide a single line through the words that only minimally interferes with the underlying data when viewed. However, on the other hand, a high difficulty level could drastically distort the underlying image. Distortions could include swirls, overlaying images on top of the underlying data, inverting or reversing the data, and any other obstructions that make determining the underlying data difficult.

In step 308, the challenge message generation module may send the distorted challenge message containing the one or more challenge items to the requestor. The requestor may then provide or display the challenge image to the user that is trying to gain access to the web server or service provider. The user could be provided with an entry space in which to enter an answer as to what they believe the underlying challenge message (or a requested portion of the challenge message) states or they could be presented various options for what they believe it states.

In step 309, the human challenge response test delivery service may receive a challenge verification request that may include a challenge response or other response to the challenge message from the user. The challenge verification request may be sent from the web server after the user provides the answer information to the web server. The web server could also forward a portion of the answer provided by the user if extraneous information was either entered by the user or a red herring was presented by the web server to the user such that a portion of the answer was not originally in the challenge.

In step 310, a challenge response evaluation module may determine whether the challenge response matches the challenge items included in the challenge message. Accordingly, after the challenge verification request is received from the user, the accuracy of the challenge response may be determined and a true or false is returned to the web server to indicate whether the challenge was solved or not.

In step 311, the challenge response evaluation module may return a true if the request to verify the challenge response matches the one or more challenge items included in the challenge message sent to the requestor. A true may indicate to the web server that the user answered the challenge correctly and the user must therefore be human. As explained in the definitions section previously, in some embodiments, a challenge response may not match the challenge items in a challenge message exactly and the challenge response evaluation module may implement multiple methods of determining whether an challenge response is sufficiently close to pass the test. For example, the challenge response may be provided with an accuracy score based on how close the challenge response is to the underlying challenge items. If the challenge score reaches a predetermined threshold score, the answer may be determined to be close enough that the response may have been produced by a human. If the accuracy threshold is not reached, the challenge response may not be considered as matching. Accordingly, any suitable method may be implemented to determine whether a challenge response message matches the underlying challenge items.

Finally, in step 312, the challenge response evaluation module may return a false if the challenge response did not match the one or more challenge items included in the challenge message. Accordingly, a false response from the human challenge response test delivery server may indicate to the web server that the user could not determine what the underlying challenge was and therefore, may not be a human. However, a false response does not guarantee the user is not a human. Accordingly, the web server may request another challenge message or deny access to the user.

FIGS. 4A-4D show exemplary distorted challenge messages including one or more challenge items, according to embodiments of the present invention. As can be seen from the FIGS. 4A-4D, the distorted challenge messages may comprise any relevant transaction data associated with a plurality of transactions.

FIG. 4A shows a distorted challenge message 410A including a first challenge item 411A and a second challenge item 412A. In FIG. 4A, the first challenge item in the distorted challenge message 410A may include a merchant name ("Monster Burritos") and the second challenge item may include a transaction amount. The transaction amount and the merchant name may be associated with the same transaction or may be extracted from transaction data associated with two separate transactions. The graphical user interface may further include an area where a user may type a phrase that matches the distorted challenge message. For example, the correct answer to the distorted challenge message of FIG. 4A may include "Monster Burritos $22.20." However, the challenge verification message may not require exactly that answer and the evaluation module may accept other answers as sufficiently close to matching the challenge message as to show the verification request is most likely generated from a human user operating the user device. Accordingly, verification requests including substitute digits, less or more spaces, an incorrect symbol, or any other information that may indicate that although the verification request is not perfect, it may be sufficiently close to indicate the user is a human, and thus, may be accepted.

Figure 4B:
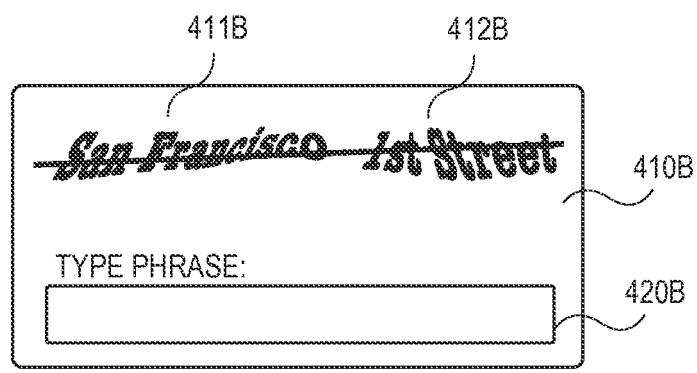

FIG. 4B shows a distorted challenge message 410B including a first challenge item 411B and a second challenge item 412B. In FIG. 4B, the first challenge item in the distorted challenge message 410B may include a city ("San Francisco") and the second challenge item may include a street name ("1$^{st}$ Street") that may be associated with a transaction. As explained previously, the transaction data may be associated with transactions that may be limited or filtered according to a particular user location. Accordingly, a user may easily recognize the city and street name included in the distorted challenge message. As the example above, the city name and the street name may be associated with the same transaction or may be extracted from transaction data associated with two separate transactions.

Figure 4C:
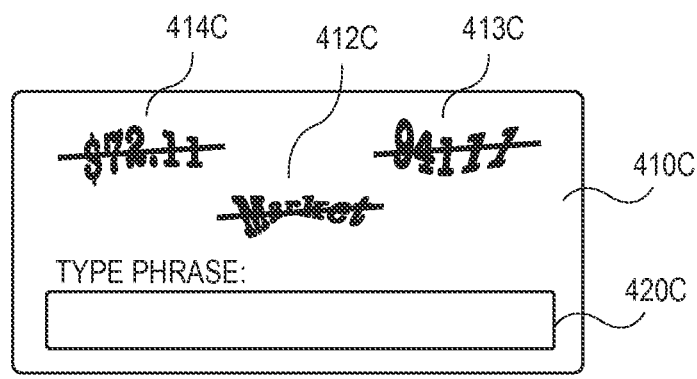

FIG. 4C shows a distorted challenge message 410C including a first challenge item 411A, a second challenge item 412C, and a third challenge item 413C. Because the distorted challenge message comprises three different challenge items, the challenge message request associated with the distorted challenge message may have included a higher difficulty level or the requestor may be providing sensitive data through their web server. Accordingly, the higher difficulty level led to more challenge items being chosen during generation of the challenge message. The challenge items 411C-413C may include a transaction amount (e.g., $72.11), a street name or a portion of a merchant's name (e.g., Market), and a zip code (e.g., 94111), associated with one or more transactions. However, any other transaction data associated with a plurality of transactions may be included.

Figure 4D:
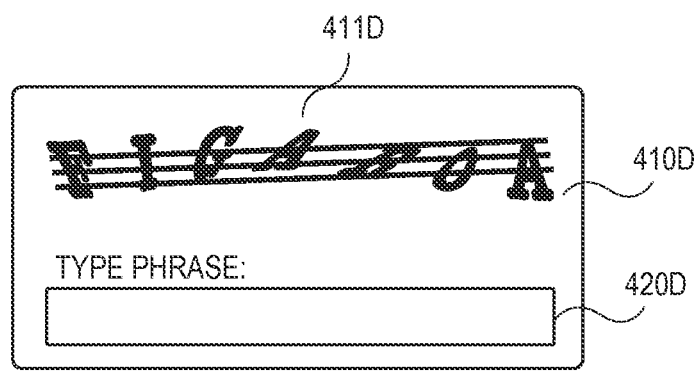

FIG. 4D shows a distorted challenge message 410D including a single challenge item 411D. The challenge item may include the name of a street (e.g., Figaroa). However, the difficulty level may be elevated for this example because of the distortion that is applied to the single challenge item. Accordingly, the difficulty level may increase the number of challenge items, increase the amount of distortion, and/or increase the length of challenge items. Although a computer program may have difficulty determining that the challenge message includes a single word, a user may easily recognize a street that is near the area where they have initiated transactions in the past or where they live. Accordingly, the familiar challenge message may improve the accuracy of the human challenge response tests without decreasing the effectiveness of the test against computer programs.

B. Mutual Authentication Using a Human Challenge Response Test

Figure 5:
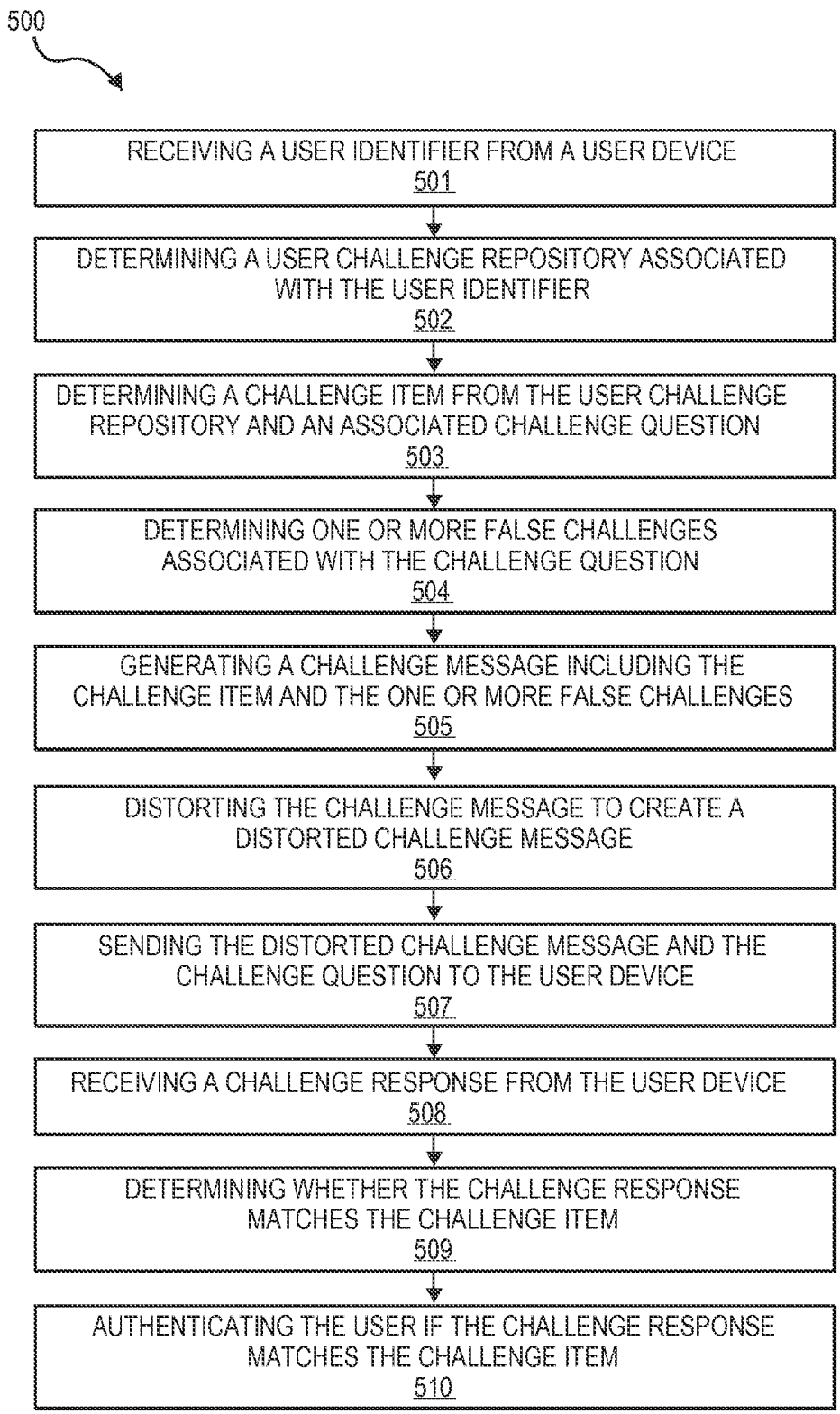
FIG. 5 shows a flow chart describing a method of providing a human challenge response test during a mutual authentication process according to one embodiment of the invention.

FIG. 5 shows a flow chart describing a method of providing a human challenge response test delivery service in order to authenticate a user as not only being a human, but a particular human. Accordingly, a human challenge response test delivery server may be used to generate a challenge message using personal or account information for a particular user and one or more false challenge items. Accordingly, the human challenge response test delivery server may determine not only whether the user is able to read distorted challenge messages but whether the user can choose the correct challenge item out of a distorted challenge message filled with fake challenges and a single correct challenge item.

In step 501, the human challenge response test delivery service receives a user identifier from a user device. A user may contact a service provider through a communications network (e.g., the internet, wireless communications network, etc.) and request access to secure information or may request a service. In order to identify the user, the service provider may ask the user for a user identifier. For example, as shown in FIGS. 6-7 and 9-10, the user may be asked to enter an email address or phone number associated with their user account through the service provider. Additionally user identifiers may include a username, personal information (e.g., social security number, date of birth, home address, etc.), or any other unique identifiable information for a user. The user may provide the user identifier by sending a communication message including the user identifier to the service provider.

In step 502, the user challenge repository determination module may determine a user challenge repository associated with the user identifier. The human challenge response test deliver server may use the received user identifier to determine a user challenge repository that is associated with a user. The user challenge repository may comprise challenge items that include information that the user has provided the service provider during a registration period or other personal information that the user may recognize as being associated with their account at the service provider. Furthermore, although personal identifier information (PII) and personal account information (PAI) may be filtered from the user challenge repository, portions of such information may be used to inform a user that the service provider has access to their sensitive information. For example, the last four digits of a user's account number, social security number, or other sensitive information may be used in a challenge message. Although the information comes from PII and PAI, the challenge message may not open a security threat because the information is not enough on its own to create a security threat. For example, no account access may be provided or transaction may be initiated by only knowing the last four digits of an account. Accordingly, in some embodiments, determining a user challenge repository may include generating a user challenge repository using a user information database including personal or account information associated with the user identifier. Accordingly, the PAI and PII may be removed during generation of the user challenge repository and one or more challenge items may be extracted from the user information database to generate a user challenge repository. Extraction and generation of the user challenge repository may be similar to the extraction and challenge repository generation process described in reference to FIG. 3 above.

In step 503, the challenge message generation module may determine a challenge item from the user challenge repository and an associated challenge question. The challenge items may include any information from the user challenge repository and the challenge items may be stored with a reference to a corresponding or associated challenge question. The challenge item selected should be relevant to the challenge question and vice versa such that the challenge question may provide a hint or indication of the correct challenge item in the challenge message. For example, the challenge question may be "What is the name of your first dog?" and the correct challenge item may be "Fido." Accordingly, the challenge item may be relevant and personal to the user and the challenge question may indicate to the user the correct familiar relationship between the challenge item and the user.

In step 504, the challenge message generation module may determine one or more false challenges associated with the challenge question. The one or more false challenges may be relevant to the selected challenge question and may be extracted from a false challenges database associated with the selected challenge question. Accordingly, using the example above, for the challenge question, "What is the name of your first dog?," the false challenges selected by the challenge message generation module may be relevant to the question and include other possible or common names to dogs (e.g., Spike, Lassie, etc.). As such, if a malicious third party tried to use the user identifier to gain access to the secure information, the malicious third party may have to not only be human because the information is presented in a human challenge response test challenge message, but may have to know personal or account information that the user may have selected or provided during a registration period in order to know the correct challenge item to replicate from the distorted challenge message.

The challenge message generation module may also determine a difficulty level corresponding to the user identifier, similar to the process described above in reference to FIG. 3. The difficulty level may determine the challenge item selected, the number of false challenges included in the challenge message, the amount of distortion applied to the challenge message, or any other variable in the challenge message generation.

In step 505, the challenge message generation module generates a challenge message including the challenge item and the one or more false challenges. The challenge message may be an image of the challenge item and one or more false challenges that is rendered by the challenge message generation module, or the challenge message may include the collection of the challenge item and the one or more false challenges and the image may be generated when the distortion of the challenge message is applied.

In step 506, the challenge message distortion module distorts the challenge message to create a distorted challenge message. As explained previously, the level of distortion may be affected by the difficulty level for the challenge message. The difficulty level may be determined by any suitable method and described herein.

In step 507, the challenge message distortion module sends the distorted challenge message and the challenge question to the user device. The user may receive the distorted challenge message and the challenge question and display the challenge message and associated challenge question through any suitable graphical user interface. Exemplary graphical user interfaces are shown in FIGS. 6-10. Accordingly, the graphical user interface may include an area where a user may answer the question and submit the answer in the form of a challenge response to the service provider.

In step 508, the human challenge response test server computer may receive a challenge response from the user device. The user may submit the challenge response with the user's best answer to the challenge question using a challenge item in the distorted challenge message. In some embodiments, the user may be able to answer that none of the challenge items are correct and the challenge response may include an alternative answer such as, for example, "none" or a fill in answer that the human challenge response test server computer may then be able to compare to the user information database. Any suitable alternatives may also be implemented.

In step 509, the challenge response evaluation module determines whether the challenge response matches the challenge item. The challenge response may include an answer to the challenge question that corresponds to one of the provided challenge items or false challenges in the challenge message. For example, if a challenge message includes ten different words (i.e., one challenge item and nine false challenges), the challenge message may include any number of words in response. However, a correct answer may only include the challenge item (which could be multiple words, symbols, or strings or a single word, character, sentence, or string of characters). Accordingly, in some embodiments, if more than the challenge item is included in the challenge response, the evaluation may be negative even if the correct challenge item was included. As explained above in reference to FIG. 4, the challenge response evaluation module may evaluate a response as correct even if it does not match exactly with a challenge item. Accordingly, any suitable method for determining whether a response is sufficiently close to a challenge item may be implemented to determine if a correct response was provided.

In step 510, the challenge response evaluation module authenticates the user if the challenge response matches the challenge item. Alternatively, if the challenge response does not match the challenge item, the user may not be authenticated and the system may not provide the user access to the secure information. Accordingly, if the correct challenge item is entered, the user may be authenticated to the service provider because the user entered the correct answer to the challenge question. Furthermore, because the system provided the user with the correct answer, and therefore knew information about the user that was provided to the service provider at enrollment or other time, the user authenticates the service provider. Therefore, a mutual authentication between the user and the service provider has occurred. Additionally, the user is also authenticated as a human user because the information was provided in a format that only a human user could recognize. Therefore, two functions may be completed in a single human challenge response test.

Figure 6:
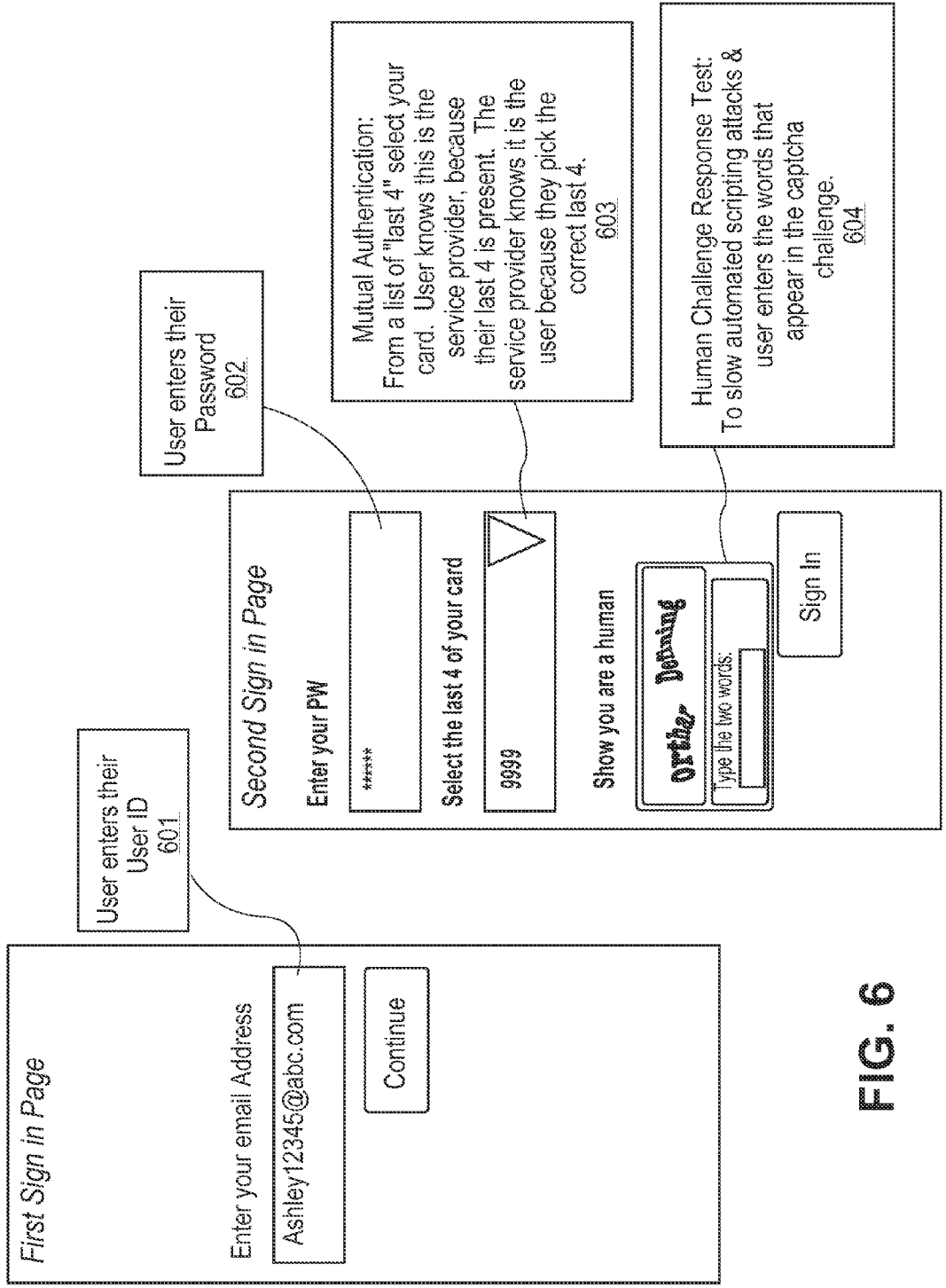
FIG. 6 shows a graphical user interface for a process of authenticating a user to a service provider, including a test to ensure the user is human.

FIG. 6 shows an exemplary graphical user interface for a user login process comprising mutual authentication of a user and a service provider including a test to ensure the user is human. The graphical user interface of FIG. 6 shows an existing system that is not implementing embodiments of the present invention. In a typical mutual authentication process, a user may receive the displayed first sign-in page when contacting a service provider in order to authenticate themselves for entry to a secured page or to secure user information data on the web server. Currently there are four steps a user may undertake in order to complete a mutual authentication in such a system.

First, in step 601, the user may enter a predetermined user identifier that was set during an enrollment period. The user identifier is sent to the service provider who responds with a second webpage requesting further information.

Second, in step 602, the user may enter their password. Verifying the correct password lets the service provider know that the user is who they present themselves to be. At this point, assuming the correct password is entered, a user may be authenticated to a service provider. However, even if the user is authenticated to the service provider, the service provider is not authenticated to the user because the service provider has not provided any information or shared information that any other entity would not be capable of providing.

Third, the user may select from a list of information associated with the user identifier so that the service provider may be authenticated to the user (e.g., the last four digits that match the user's credit card). The shared information being present informs the user that the service provider is who they say they are because the service knows information that is associated with the user, such as, for example the last four digits of the user's credit card account number. Additionally, the user may be provided with a large list of available false challenges (e.g., potential last four digits of credit card numbers) so that the user's information cannot be stolen or guessed (since there are too many potential options).

Finally, to slow automated scripting attacks and ensure the user is a human, the user may enter the words that appear in a human challenge response test challenge to ensure that the user is a human. This human challenge response test may authenticate the user as a human and make sure that automated computer programs cannot access the secure information or enroll in the system.

Figure 7:
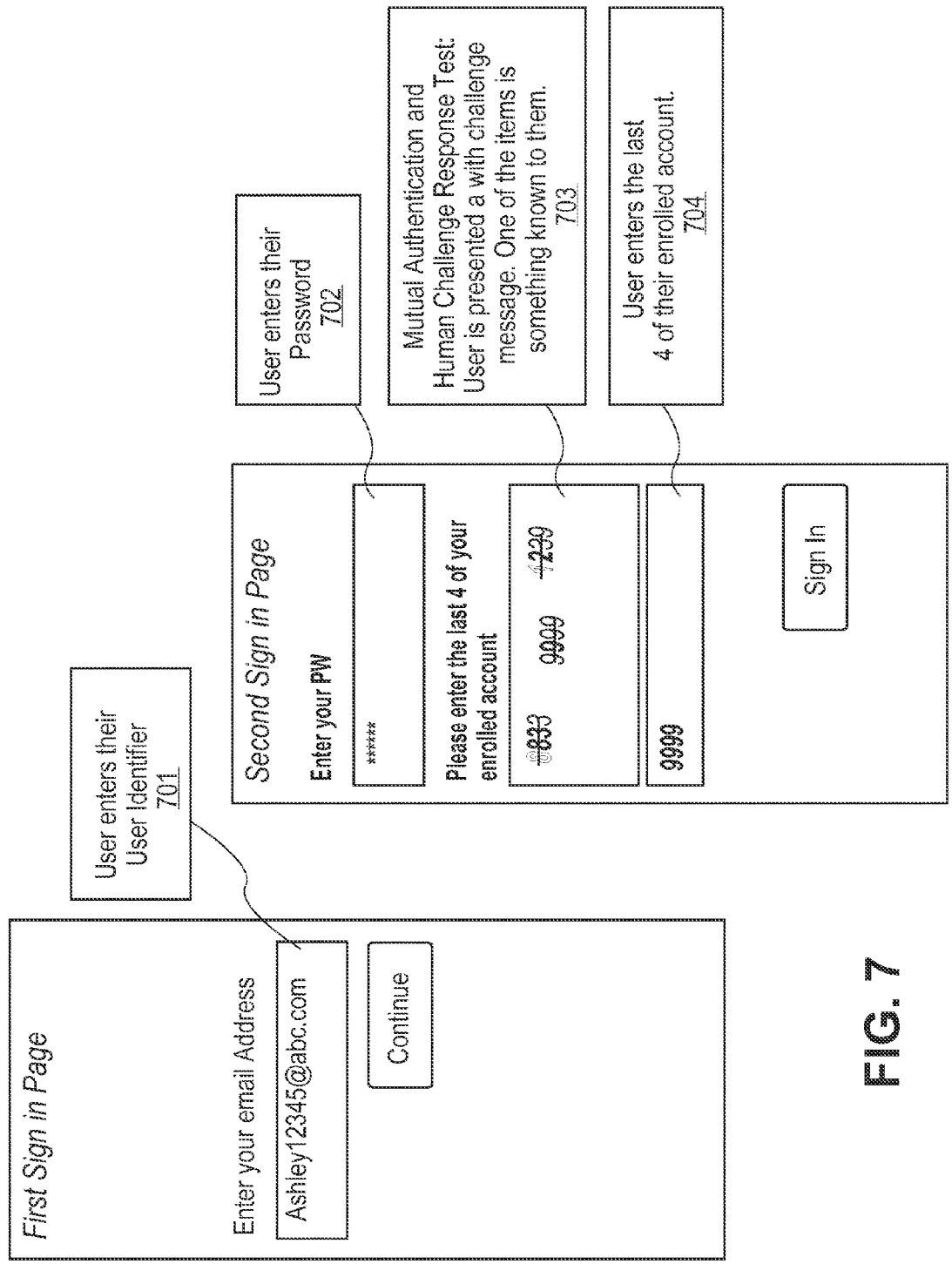
FIG. 7 shows a graphical user interface for authentication of a user to a service provider which also provides mutual authentication of a user and a service provider, according to embodiments of the invention integrating a human challenge response test as part of the authentication process.

FIG. 7 shows a graphical user interface for a login comprising mutual authentication of a user and a service provider according to embodiments of the present invention integrating a human challenge response test and familiar user information as part of the mutual authentication. This embodiment allows mutual authentication using a human challenge response test in fewer steps than the previous system and helps human users pass human challenge response test challenges while maintaining the difficulty of circumvention by automated systems by providing familiarity to human users without providing hints that could be utilized by automated systems. The human challenge response test authentication system can provide the same mutual authentication with three steps instead of four.

First, in step 701, the user may enter a predetermined user identifier that was set during an enrollment period. The user identifier is sent to the service provider who responds with a second webpage requesting further information.

Second, in step 702, the user may enter their password. Verifying the correct password lets the service provider know that the user is who they present themselves to be.

Finally, in step 703, a human challenge response test challenge may incorporate information associated with the user identifier provided by the user (e.g., the last four digits of the user's credit card) for verification in order to mutually authenticate the parties in fewer steps. The information associated with the user identifier could include past transaction data (e.g., the last five merchants the user identifier initiated a transaction with or the past five transaction amounts, etc.), personal account information (current address, current balance, last 4 digits of credit card, etc.), or past personal information (e.g., prior addresses, phone numbers, etc.). Accordingly, a distorted challenge message may be generated and delivered to the user including a challenge item and numerous false challenges as described above in reference to FIG. 5.

The challenge message may include multiple items with at least one of the items being known to the user (challenge item) and the challenge item being extracted from the challenge repository associated with the user identifier. When the user recognizes the item, the user authenticates the service provider. Furthermore, the service provider authenticates the user because the user must know the item in order for the user to answer the challenge correctly because there are also one or more false challenges that seem to be potentially correct answers. For example, the human challenge response test authentication service may be implemented using a "last 4 digit" challenge question. The challenge message may include multiple "last 4 digit" numbers and the user may enter only one of the "last 4 digit" numbers into the answer portion, typically the "last 4 digit" number that the user recognizes as being drawn from the user's account number.

Additionally, the system provides the benefit of slowing automated scripting attacks because the system incorporates the human challenge response test delivery system into the authentication step. Furthermore, the challenge message is easier for the user to decipher because the challenge comprises familiar information that is easily recognizable by the user. For example, a challenge that incorporates the last four digits of a user's credit card account number will be easier for the user to answer correctly than a random challenge message comprising multiple alphanumeric characters because the user will recognize their last four digits more readily than random numbers and letters. However, the collection of data appears random to an automated computer with no knowledge of the user's credit card account number.

FIGS. 8A-8D show exemplary embodiments of some additional challenge messages including a challenge item, a plurality of false challenges, and challenge questions that may be sent to a user for mutual authentication of a user and a service provider, according to exemplary embodiments of the present invention.

FIG. 8A shows a challenge message 820A including a challenge item associated with a challenge question 810A. The challenge message 820A also includes eight false challenges associated with the challenge question 810A. In this example, the challenge question 810A includes a question for the user of what the user's mother's maiden name is and the challenge item is the correct answer, "Smith." However, eight false challenges are included in the challenge message 820A that are associated with the challenge question 810A. Accordingly, all of the false challenges include possible answers to the challenge question including typical last name's that may be a user's mother's maiden name (e.g., Jackson, Lewis, etc.). A challenge response field 830A is provided for the user to enter the answer to the challenge question.

In this example, the user has entered the correct challenge item and the response would be considered successful if the user submitted this answer. Accordingly, the service provider may authenticate the user because the user knew the answer to the challenge question. Furthermore, the user may authenticate the service provider because the service provider knows the correct answer to the challenge question because it was included in the challenge message. Accordingly, not only has the user been authenticated as a human but the user and the service provider may be mutually authenticated after a successful submission of the challenge response.

FIG. 8B shows another exemplary embodiment where the challenge question 810B is "what is the name of the user's first dog." The challenge message 820B includes a challenge item ("Fido") as well as five other false challenges that are associated with the challenge question 810B by being potential answers to the challenge question 810B.

FIG. 8C shows another exemplary embodiment where the challenge question 810C is "what are the last four digits of the user's account number." The challenge message 820C includes a challenge item ("3528") as well as seven false challenges that are associated with the challenge question 810C by being potential answers to the challenge question 810C.

FIG. 8D shows another exemplary embodiment where the challenge question 810D is "what is the user's last four digits of their phone number." The challenge message 820D includes a challenge item ("7328") as well as six false challenges that are associated with the challenge question 810D by being potential answers to the challenge question 810D.

Figure 9:
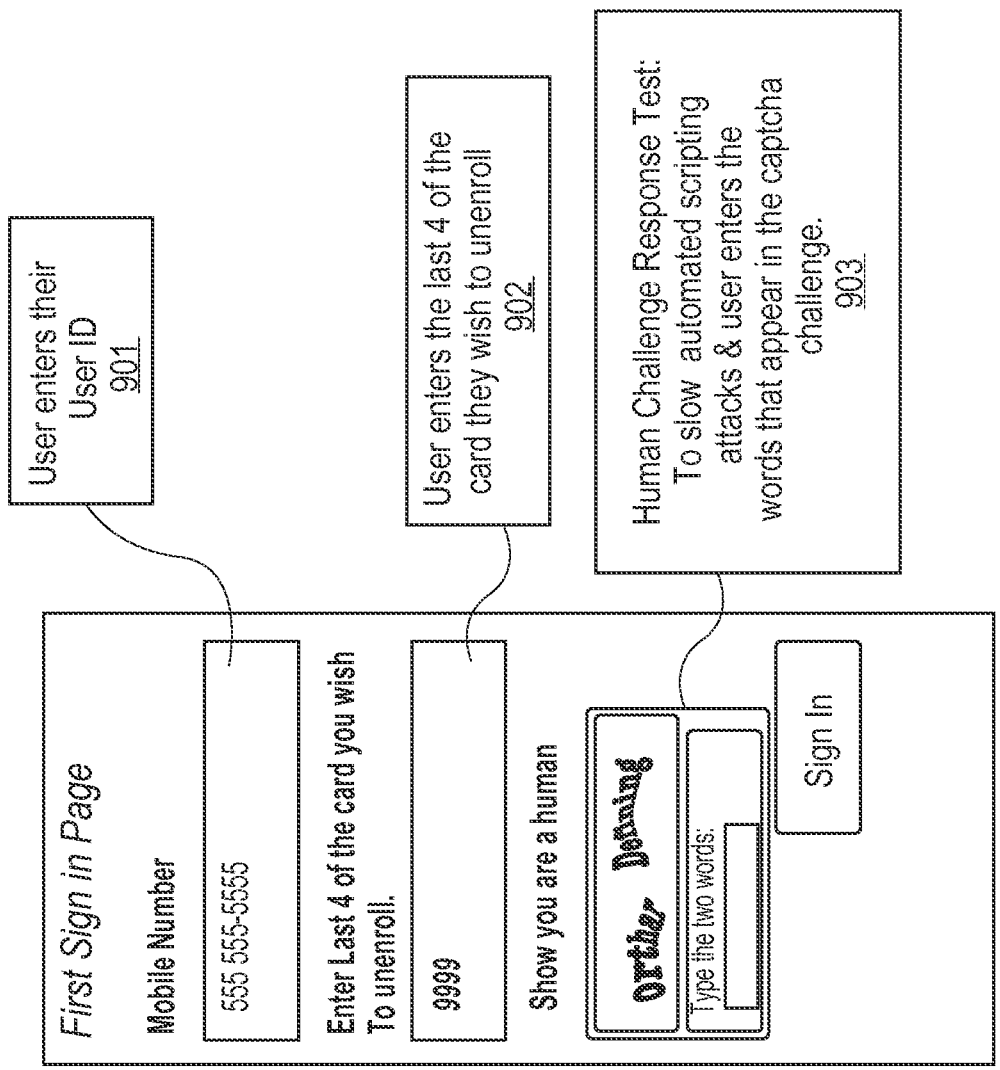
FIG. 9 shows a graphical user interface for a process of authenticating a user to a service provider during an un-enrollment process, including a test to ensure the user is human.

FIG. 9 shows a graphical user interface for authentication of a user to a service provider during an un-enrollment process including a test to ensure the user is human In some embodiments, the un-enrollment comprises three steps by the user including entering a user identifier associated with the user (e.g., a mobile telephone number), entering a second identifier associated with the user, (e.g., the last four digits of the credit card number they are attempting to un-enroll), and entering the answer into a human challenge response test response area.

Figure 10:
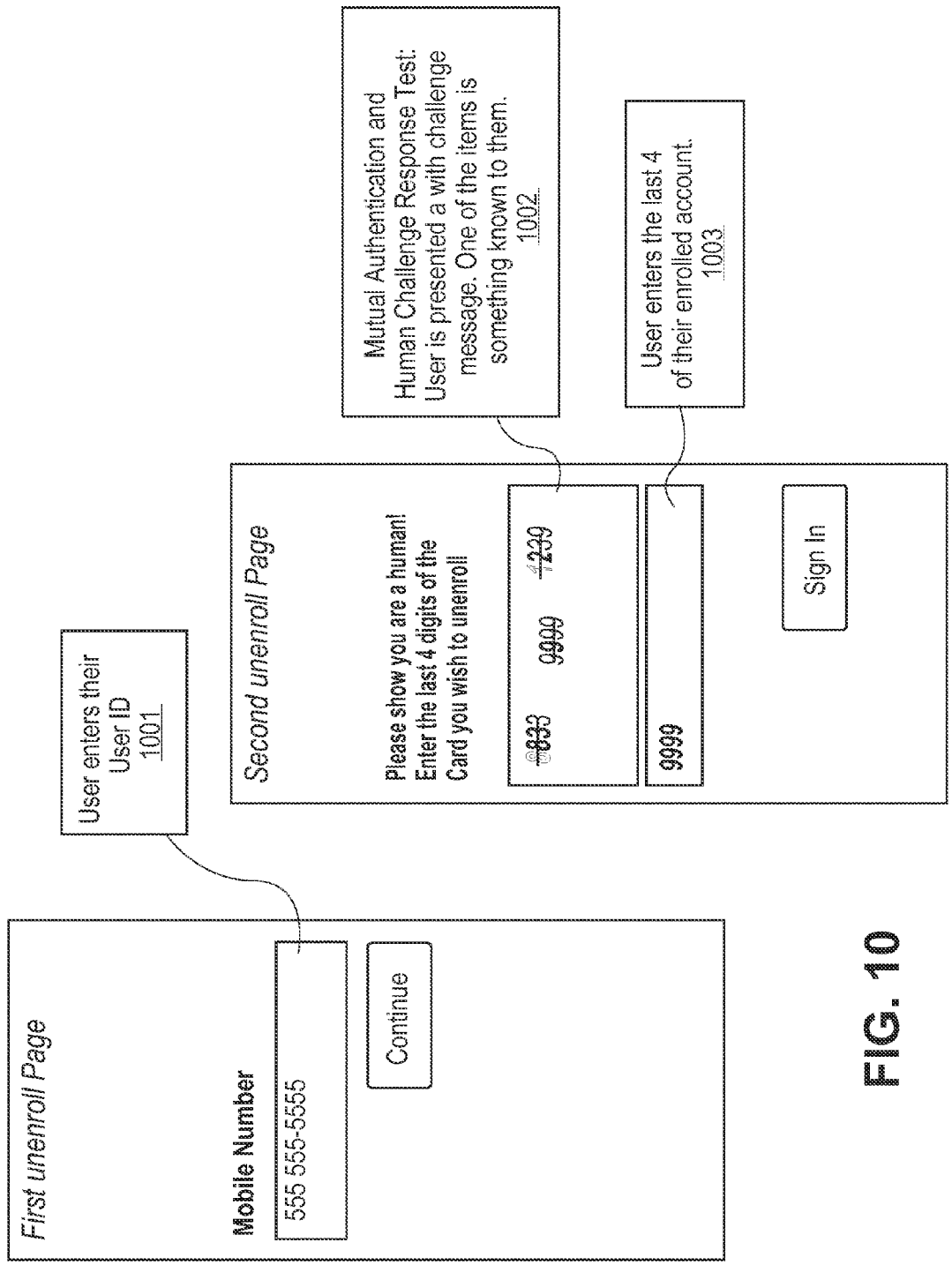
FIG. 10 a graphical user interface for mutual authentication of a user and a service provider during an un-enrollment process, according to embodiments of the invention integrating a human challenge response test as part of the mutual authentication.

FIG. 10 shows a graphical user interface for mutual authentication of a user and a service provider during an un-enrollment process according to embodiments of the invention integrating a human challenge response test and familiar user information as part of the mutual authentication. The system can be implemented without a password being used because the information exchanged in the human challenge response test challenge provides the mutual authentication between the parties, as described above. Fewer steps are required using the human challenge response test mutual authentication procedure because the user only has to enter their mobile number and match the "last 4 digits" that is shown in the challenge. As discussed above, the challenge message may include any information that can mutually authenticate the user and the service provider and provide familiar information to the user that will make passing the challenge easier.

III. Technical Advantages

Embodiments of the present invention provide a number of technical advantages that lead to technical effects. For example, one embodiment of the present invention generates a dynamic challenge repository from transaction data that may be localized or personalized for a particular user. The dynamic challenge repository provides a more secure system that impedes hackers or malicious third party's attempts at cracking or hacking the human challenge response test delivery system. Furthermore, the use of personalized or familiarized data in the challenge messages provides a more effective and accurate testing system that may result in the more efficient use of system resources. Additionally, another embodiment may incorporate human challenge response tests with mutual authentication and may accomplish both tasks in fewer steps and using fewer resources than previous systems. These technical advantages and their effects are described in further detail below.

First, in one embodiment of the present invention, a challenge repository may be created from transaction data that is generated constantly. The vast amount of transaction data that is sent to and from financial entities provides enough random data that it may be very difficult for a computer system to determine enough random combinations of the data to contravene the human challenge response test delivery service. Additionally, a challenge repository may be generated for each challenge message request, generated periodically according to a predetermined time period or event, or may be generated randomly. Therefore, the challenge repository is dynamic and even if a hacker or malicious third party gains access to the challenge repository, the challenge repository may be regenerated with new transaction data at the next request or within a short period of time. Accordingly, the dynamic challenge repository provides a more secure system that impedes hackers or malicious third party's attempts at cracking or hacking the human challenge response test delivery system.

Additionally, the challenge messages may be used in a method to mutually authenticate a user and a service provider. Typically, such mutual authentication including a human challenge response test includes multiple communications being generated and directed to separate parties. However, in one embodiment of the present invention, the human challenge response test delivery server may incorporate a user's personal or account information into a challenge message including multiple false challenges and an associated challenge question. As such, the human challenge response test delivery server may authenticate the service provider to the user by providing information that only the service provider would know, and the user may be authenticated to the service provider by the user selecting the correct challenge item from the one or more false challenges included in the challenge message. Additionally, the user may be authenticated as being a human because the information may be presented in a distorted format such that only a user may be able to determine the underlying content of the challenge message. As such, one embodiment of the present invention provides mutual authentication and a human challenge response test through fewer communication messages than previous systems. Therefore, embodiments of the present invention save system resources and are more efficient than previous systems. Accordingly, authenticating through the use of a human challenge response test may accomplish mutual authentication between the users in fewer steps than currently required by methods of mutual authentication. Additionally, the transaction details could be familiar to the user and could raise the chance the user was able to determine the correct challenge without providing an automated program any advantage in solving the human challenge response test.

Additionally, embodiments of the present invention provide challenge messages that are generated using familiar data. For example, challenge messages may be generated using challenge items from transactions initiated near the user's location or may be associated with user information. Accordingly, the challenge messages may be easier to decipher by the user but may not be any easier to decipher by a computer program or malicious third party. Therefore, the effectiveness of the system may be improved because users that are humans may be provided with an easier challenge message to solve, without non-humans gaining any advantage in solving the challenge messages. Accordingly, fewer users that are human may respond with incorrect challenge verification requests or challenge responses. Therefore, the system may save resources by having fewer repeat requests for additional human challenge response tests by users that should have answered the first challenge message correctly, if the underlying challenge items were more familiar to the user.

Finally, embodiments of the present invention provide a customizable difficulty level based on security levels of requestors or request messages in order to access information. As such, a more efficient, effective, and secure system is provided because the difficulty of tests may match the security level necessary for a request. Accordingly, if the information being accessed is of a minimal security level, a user may not be provided with an extremely difficult human challenge response test that they may not be able to solve quickly and easily. Accordingly, more incorrect responses may be received even though the user is a human and the information is not particularly sensitive. Therefore, less human challenge response tests may be necessary due to re-tests for human users that are trying to gain access to information they are authorized to access. As such, embodiments of the present invention may result in system resources may be saved as fewer requests may be generated due to fewer requests because users are more accurately determined to be human.

IV. Exemplary Computer Systems

FIG. 11 is a high level block diagram of a computer system that may be used to implement any of the entities or components described above. The subsystems shown in FIG. 11 are interconnected via a system bus 1102. Additional subsystems such as a printer 1110, keyboard 1118, fixed disk 1120, and monitor 1112, which is coupled to display adapter 1114. Peripherals and input/output (I/O) devices, which couple to I/O controller 1104, can be connected to the computer system by any number of means known in the art, such as serial port 1184. For example, serial port 1116 or external interface 1122 can be used to connect the computer apparatus to a wide area network such as the Internet, a mouse input device, or a scanner. The interconnection via system bus 1102 allows the central processor 1108 to communicate with each subsystem and to control the execution of instructions from system memory 1106 or the fixed disk 1120, as well as the exchange of information between subsystems. The system memory 1106 and/or the fixed disk 1120 may embody a computer readable medium.

As described, the inventive service may involve implementing one or more functions, processes, operations or method steps. In some embodiments, the functions, processes, operations or method steps may be implemented as a result of the execution of a set of instructions or software code by a suitably programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving transaction data associated with a plurality of transactions at a server computer;
scrubbing the transaction data of personally identifiable information that can be used to identify a person or an account associated with the transaction data;
extracting, by the server computer, a plurality of challenge items from the scrubbed transaction data using an extraction algorithm, the extraction algorithm selecting the plurality of challenge items from data strings in the transaction data;

storing, by the server computer, the plurality of challenge items in a challenge repository, wherein the plurality of challenge items may be used to generate distorted challenge messages;

electronically providing, by the server computer to a user device over a communications network, a distorted challenge message comprising one or more of the plurality of challenge items from the challenge repository along with other distorted challenge items not derived from the received transaction data; and receiving, by the server computer from the user device over the communications network, a selection of the one or more of the plurality of challenge items from the challenge repository from among the one or more challenge items and the other distorted challenge items.

2. The method of claim 1 further comprising:
receiving a challenge message request from a requestor;
determining a difficulty level for the challenge message request;
generating a challenge message comprising the one or more of the plurality of challenge items from the challenge repository;
distorting the challenge message to create the distorted challenge message;
sending the distorted challenge message to the requestor;
receiving a challenge verification request including a user input from the requestor;
determining whether the user input included in the challenge verification request matches the one or more of the plurality of challenge items included in the challenge message; and
sending a challenge verification response indicating whether the user input included in the challenge verification request matches the one or more of the plurality of the challenge items included in the challenge message, wherein the challenge verification response indicates that a user associated with the requestor is human where the challenge verification response indicates the user input matches the one or more of the plurality of the challenge items in the challenge message.

3. The method of claim 2 wherein determining the difficulty level for the challenge message request further comprises determining a security level based on requestor information, wherein the requestor information includes at least one of the identity of the requestor, a type of service provided by the requestor, or the location of the requestor.

4. The method of claim 2, wherein the one or more of the plurality of challenge items includes a number of challenge items determined by the difficulty level.

5. The method of claim 2, wherein the challenge message is distorted according to the difficulty level, wherein the distorted challenge message has a high amount of distortion if the difficulty level is high and a low amount of distortion if the difficulty level is low.

6. The method of claim 1 wherein extracting the plurality of challenge items from the transaction data further comprises:
determining a location of a user; and
extracting the plurality of challenge items from transaction data associated with transactions initiated near the location of the user.

7. The method of claim 1, wherein the plurality of challenge items are stored according to their level of complexity.

8. A server computer comprising:
a processor; and
a non-transitory computer readable medium coupled to the processor and comprising code executable by the processor to implement a method, the method comprising:
receiving transaction data associated with a plurality of transactions;
scrubbing the transaction data of personally identifiable information that can be used to identify a person or an account associated with the transaction data;
extracting a plurality of challenge items from the scrubbed transaction data using an extraction algorithm, the extraction algorithm selecting the plurality of challenge items from data strings in the transaction data;
storing the plurality of challenge items in a challenge repository, wherein the plurality of challenge items may be used to generate distorted challenge messages;
electronically providing, to a user device over a communications network, a distorted challenge message comprising one or more of the plurality of challenge items from the challenge repository; and
receiving, from the user device over the communications network, a selection of the one or more of the plurality of challenge items from the challenge repository from among the one or more challenge items and the other distorted challenge items.

9. The server computer of claim 8, wherein the method further comprises:
receiving a challenge message request from a requestor;
determining a difficulty level for the challenge message request;
generating a challenge message comprising the one or more of the plurality of challenge items from the challenge repository;
distorting the challenge message to create the distorted challenge message;
sending the distorted challenge message to the requestor;
receiving a challenge verification request including a user input from the requestor;
determining whether the user input included in the challenge verification request matches the one or more of the plurality of challenge items included in the challenge message; and
sending a challenge verification response indicating whether the user input included in the challenge verification request matches the one or more of the plurality of the challenge items included in the challenge message, wherein the challenge verification response indicates that a user associated with the requestor is human where the challenge verification response indicates the user input matches the one or more of the plurality of the challenge items in the challenge message.

10. The server computer of claim 9 wherein determining the difficulty level for the challenge message request further comprises determining a security level based on requestor information, wherein the requestor information includes at least one of the identity of the requestor, a type of service provided by the requestor, or the location of the requestor.

11. The server computer of claim 8 wherein extracting the plurality of challenge items from the transaction data further comprises:

determining a location of a user; and extracting the plurality of challenge items from transaction data associated with transactions initiated near the location of the user.

12. The server computer of claim 8, wherein the plurality of challenge items are stored according to their level of complexity.

13. The server computer of claim 8, wherein a number of challenge items included in the challenge message is determined by the difficulty level.

14. The server computer of claim 8, wherein the challenge message is distorted according to the difficulty level, wherein the distorted challenge message has a high amount of distortion if the difficulty level is high and a low amount of distortion if the difficulty level is low.

15. A method comprising:
    providing, by a user device operated by a user, a user identifier to a server computer via a communications network;
    receiving, by the user device and from the server computer over the communications network, a plurality of distorted challenge items, wherein one or more of the distorted challenge items in the plurality of distorted challenge items is derived from transaction data relating to a transaction conducted by the user;
    selecting, by the user device in response to input by the user, the one or more distorted challenge items derived from the transaction data from the plurality of distorted challenge items; and
    providing, by the user device to the server computer over the communications network, the selection of the one or more distorted challenge items,
    wherein the server computer thereafter verifies that the user is authentic and that the input was from a human and not a computer program after receiving the selection of the one or more distorted challenge items.

16. The method of claim 15, wherein one or more of the distorted challenge items in the plurality of distorted challenge items is derived from account information associated with the user identifier.

17. The method of claim 15, wherein one or more of the distorted challenge items in the plurality of distorted challenge items is derived from transaction information associated with the user identifier.

18. The method of claim 15, wherein a number of distorted challenges in the received plurality of distorted challenge items is determined based on a difficulty level associated with the user device and/or a request including the user identifier.

19. The method of claim 15, wherein the server computer derives one or more of the plurality of challenge items by determining a user information database associated with the user identifier, scrubbing the user information database of personally identifiable information that can be used to identify the user or an account associated with the user information database, and extracting a plurality of personal challenge items from the scrubbed transaction data using an extraction algorithm, the extraction algorithm selecting the plurality of personal challenge items from data strings in the scrubbed user information database.

20. The method of claim 15, wherein the distorted challenge items are distorted according to a difficulty level associated with user device and/or a request including the user identifier, wherein the distorted challenge items have a high amount of distortion if the difficulty level is high and a low amount of distortion if the difficulty level is low.

* * * * *